United States Patent
Benishti et al.

(10) Patent No.: US 10,382,748 B2
(45) Date of Patent: *Aug. 13, 2019

(54) COMBINING VIDEO-BASED AND OPTIC-BASED AUGMENTED REALITY IN A NEAR EYE DISPLAY

(71) Applicant: Augmedics Ltd., Yokneam Illit (IL)

(72) Inventors: Nessi Benishti, Kfar Saba (IL); Nissan Elimelech, Beerotaim (IL); Stuart Wolf, Yokneam (IL); Elazar Gerland, Hinanit (IL)

(73) Assignee: Augmedics Ltd., Yokneam Illit (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,740

(22) Filed: Oct. 15, 2018

(65) Prior Publication Data

US 2019/0043238 A1    Feb. 7, 2019

Related U.S. Application Data

(63) Continuation of application No. 15/896,102, filed on Feb. 14, 2018, now Pat. No. 10,134,166, which is a (Continued)

(30) Foreign Application Priority Data

Mar. 24, 2015 (GB) .................................. 1504935.6

(51) Int. Cl.
*H04N 13/383* (2018.01)
*G06T 19/00* (2011.01)
(Continued)

(52) U.S. Cl.
CPC ....... *H04N 13/383* (2018.05); *G02B 27/0172* (2013.01); *G06F 3/013* (2013.01);
(Continued)

(58) Field of Classification Search
None
See application file for complete search history.

(56) References Cited

U.S. PATENT DOCUMENTS 4,863,238 A    9/1989 Brewster
5,441,042 A    8/1995 Putman
(Continued)

FOREIGN PATENT DOCUMENTS

DE    202004011567 U1    11/2004
EP         1640750 A1     3/2006
WO      2015058816 A1     4/2015

OTHER PUBLICATIONS

European Patent Application # 16767845.7 Office Action dated May 21, 2019.

(Continued)

*Primary Examiner* — David H Chu
(74) *Attorney, Agent, or Firm* — Kligler & Associates

(57) ABSTRACT

Apparatus, including a retaining structure (54), positioned near a subject's eye that has a pupil with a diameter, an optical combiner (52A) mounted on the structure before the eye, and a pixelated screen (60A) having an array of variably transparent pixels coating the combiner. There is an image capturing device (68A) mounted on the structure to capture an image of a scene viewed by the eye, and a projector (64A) is mounted on the structure to project at least one of a portion of the captured image and a stored image onto a section of the screen at a selected location thereof. A processor (26) renders the screen section at least partially opaque, selects the section location in response to a region of interest in the scene identified by analysis of the captured image, and determines a dimension of the section in response to the pupil diameter.

8 Claims, 14 Drawing Sheets

Related U.S. Application Data continuation of application No. 15/127,423, filed as application No. PCT/IB2016/051642 on Mar. 23, 2016, now Pat. No. 9,928,629.

(51) Int. Cl.

| | | |
|---|---|---|
| *G06F 3/01* | (2006.01) | |
| *G02B 27/01* | (2006.01) | |
| *G06K 9/00* | (2006.01) | |
| *G06K 9/46* | (2006.01) | |
| *H04N 5/33* | (2006.01) | |
| *H04N 7/18* | (2006.01) | |
| *H04N 13/344* | (2018.01) | |
| *G02B 27/00* | (2006.01) | |

(52) U.S. Cl.
CPC ........... *G06F 3/017* (2013.01); *G06K 9/0061* (2013.01); *G06K 9/4661* (2013.01); *G06T 19/006* (2013.01); *H04N 5/332* (2013.01); *H04N 7/181* (2013.01); *H04N 13/344* (2018.05); *G02B 27/0093* (2013.01); *G02B 2027/0134* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 5,792,046 A | 8/1998 | Dobrovolny |
| 6,314,310 B1 | 11/2001 | Ben-Haim et al. |
| 6,609,022 B2 | 8/2003 | Vilsmeier et al. |
| 6,610,009 B2 | 8/2003 | Person |
| 6,856,826 B2 | 2/2005 | Seeley et al. |
| 7,043,961 B2 | 5/2006 | Pandey et al. |
| 7,107,091 B2 | 9/2006 | Jutras et al. |
| 7,229,078 B2 | 6/2007 | Lechot |
| 7,320,556 B2 | 1/2008 | Vagn-Erik |
| 7,364,314 B2 | 4/2008 | Nilsen et al. |
| 7,435,219 B2 | 10/2008 | Kim |
| 7,840,256 B2 | 11/2010 | Lakin et al. |
| 7,857,271 B2 | 12/2010 | Lees |
| 7,874,686 B2 | 1/2011 | Rossner et al. |
| 7,881,770 B2 | 2/2011 | Melkent et al. |
| 7,993,353 B2 | 8/2011 | Robner et al. |
| 8,950,877 B2 | 2/2015 | Northey et al. |
| 9,149,317 B2 | 10/2015 | Arthur et al. |
| 9,179,984 B2 | 11/2015 | Teichman et al. |
| 9,498,231 B2 | 11/2016 | Haider et al. |
| 9,532,849 B2 | 1/2017 | Anderson et al. |
| 9,724,165 B2 | 8/2017 | Arata et al. |
| 9,844,413 B2 | 12/2017 | Daon et al. |
| 9,872,733 B2 | 1/2018 | Shoham et al. |
| 10,034,713 B2 | 7/2018 | Yang et al. |
| 10,080,616 B2 | 9/2018 | Wilkinson et al. |
| 10,085,709 B2 | 10/2018 | Lavallee et al. |
| 10,166,079 B2 | 1/2019 | McLachlin et al. |
| 10,194,993 B2 | 2/2019 | Roger et al. |
| 2011/0004259 A1 | 1/2011 | Stallings et al. |
| 2011/0098553 A1 | 4/2011 | Robbins et al. |
| 2012/0143050 A1 | 6/2012 | Heigl |
| 2012/0182605 A1 | 7/2012 | Hall et al. |
| 2012/0216411 A1 | 8/2012 | Wevers et al. |
| 2013/0050833 A1* | 2/2013 | Lewis ............... G06K 9/00604 359/630 |
| 2015/0018672 A1 | 1/2015 | Blumhofer et al. |
| 2015/0150641 A1 | 6/2015 | Daon et al. |
| 2015/0297314 A1 | 10/2015 | Fowler et al. |
| 2015/0351863 A1 | 12/2015 | Plassky et al. |
| 2015/0366620 A1 | 12/2015 | Cameron et al. |
| 2016/0103318 A1* | 4/2016 | Du ................... G02B 27/0068 345/633 |
| 2016/0175064 A1 | 6/2016 | Stenile et al. |
| 2016/0256223 A1 | 9/2016 | Haimer et al. |
| 2016/0302870 A1 | 10/2016 | Wilkinson et al. |
| 2017/0164919 A1 | 6/2017 | LaVallee et al. |
| 2017/0239015 A1 | 8/2017 | Sela et al. |
| 2017/0252109 A1 | 9/2017 | Yang et al. |
| 2017/0281283 A1 | 10/2017 | Siegler et al. |
| 2017/0348055 A1 | 12/2017 | Salcedo et al. |
| 2018/0003981 A1* | 1/2018 | Urey ................... A61B 3/032 |
| 2018/0193097 A1 | 7/2018 | Mclachlin et al. |
| 2018/0200002 A1 | 7/2018 | Kostrzewski et al. |
| 2018/0318035 A1 | 11/2018 | Mclachlin et al. |
| 2019/0000372 A1 | 1/2019 | Gullotti et al. |
| 2019/0015163 A1 | 1/2019 | Abhari et al. |

OTHER PUBLICATIONS

Hainich et al., "Near-Eye displays", Chapter 10 of Displays: Fundamentals and Applications, CRC press, pp. 439-504, Jul. 5, 2011.

* cited by examiner

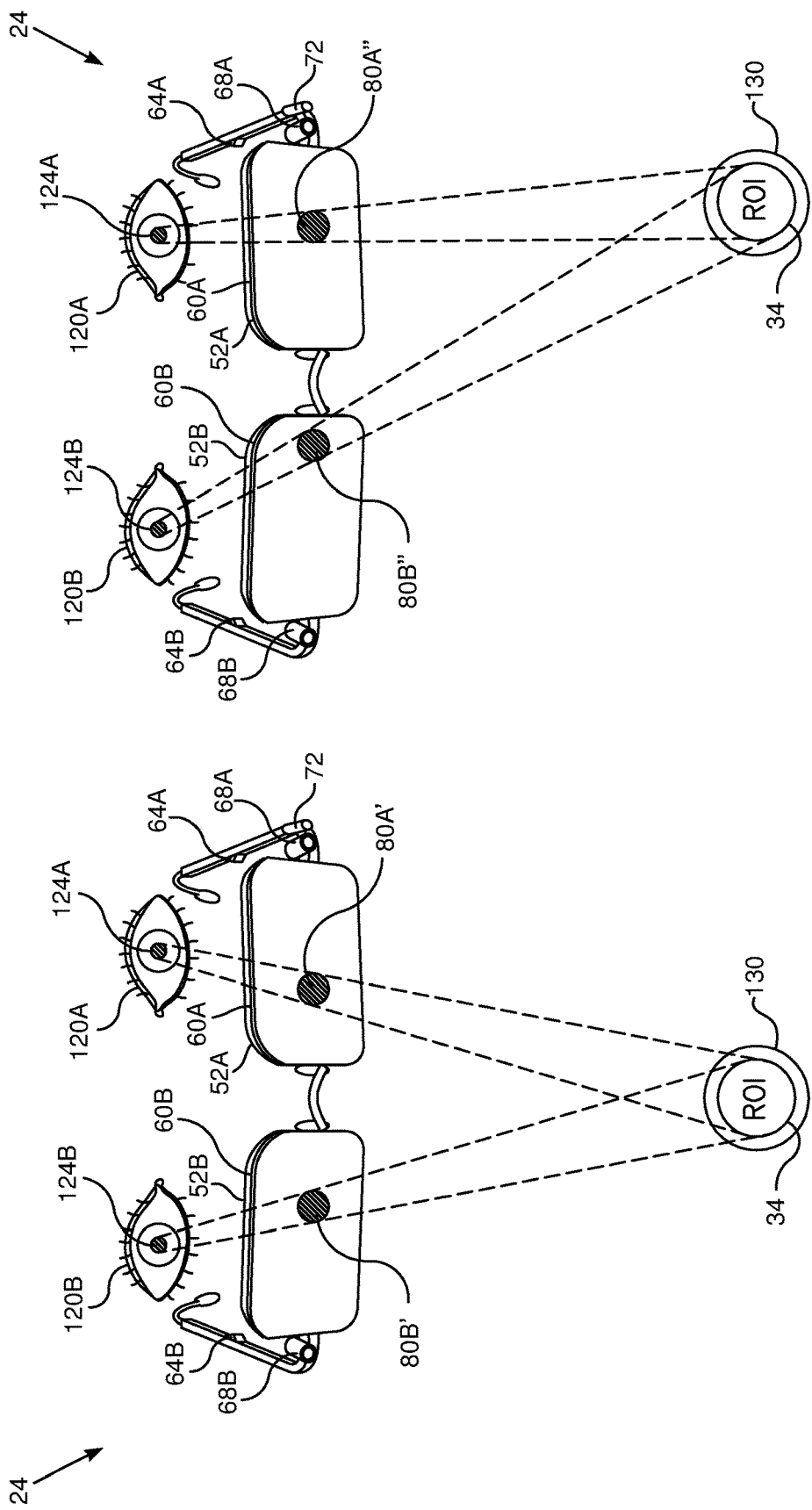

COMBINING VIDEO-BASED AND OPTIC-BASED AUGMENTED REALITY IN A NEAR EYE DISPLAY

CROSS-REFERENCE TO RELATED APPLICATIONS

This application is a continuation of U.S. patent application Ser. No. 15/896,102, filed 14 Feb. 2018, which is a continuation of U.S. patent application Ser. No. 15/127,423, filed 20 Sep. 2016 (now U.S. Pat. No. 9,928,629), in the national phase of PCT Patent Application PCT/IB2016/051642, filed 23 Mar. 2016, which claims the benefit of U.K. Patent Application GB1504935.6, filed 24 Mar. 2015, which is incorporated herein by reference.

FIELD OF THE INVENTION

The present invention relates generally to a near eye display system, and specifically to a display able to combine video-based and optic-based augmented reality.

BACKGROUND OF THE INVENTION

A near eye display system may be used in an augmented reality situation, where a scene that is being viewed by a user of the assembly is altered, typically by being augmented or supplemented. The alteration is computer processor generated, and typically involves presenting real time video, and/or non-real time images, to the user while the user is gazing at the scene.

U.S. Patent Application 2010/0149073, to Chaum et al., whose disclosure is incorporated herein by reference, describes a near eye display system. The system includes a source of modulated light, and a "proximal optic" positionable adjacent to an eye of a system user to receive the modulated light. The proximal optic has a plurality of groups of optically redirecting regions.

U.S. Patent Application 2012/0068913, to Bar-Zeev et al., whose disclosure is incorporated herein by reference, describes an optical see-through head-mounted display device. The device includes a see-through lens which combines an augmented reality image with light from a real-world scene, while an opacity filter is used to selectively block portions of the real-world scene so that the augmented reality image appears more distinctly.

U.S. Patent Application 2013/0050258, to Liu et al., whose disclosure is incorporated herein by reference, describes a see-through head-mounted display device that provides an augmented reality image which is associated with a real-world object. Initially, the object is identified by a user, e.g., based on the user gazing at the object for a period of time, making a gesture such as pointing at the object and/or providing a verbal command.

Documents incorporated by reference in the present patent application are to be considered an integral part of the application except that, to the extent that any terms are defined in these incorporated documents in a manner that conflicts with definitions made explicitly or implicitly in the present specification, only the definitions in the present specification should be considered.

SUMMARY OF THE INVENTION

An embodiment of the present invention provides apparatus, including:

a retaining structure, configured to be positioned in proximity to an eye of a subject, the eye of the subject having a pupil with a pupil diameter;

an optical combiner mounted on the structure in front of the eye;

a pixelated screen, having an array of variably transparent pixels, coating the optical combiner;

at least one image capturing device mounted on the structure configured to capture an image of a scene viewed by the eye;

a projector mounted on the structure and configured to project at least one of a portion of the captured image and a stored image onto a section of the screen at a selected location thereof; and a processor, configured to render the section of the screen at least partially opaque, to select the location of the section in response to a region of interest in the scene identified by analysis of the captured image, and to determine a dimension of the section in response to the pupil diameter.

The processor may be configured to identify the region of interest in response to radiation received by the image capturing device from at least one marker located at the region of interest.

The apparatus may include a further image capturing device configured to identify the region of interest in response to received radiation from at least one marker located at the region of interest. The at least one image capturing device may be configured to operate in the visible spectrum, and the further image capturing device may be configured to operate in the non-visible spectrum. The apparatus may include a radiator configured to radiate radiation in the non-visible spectrum towards the region of interest.

In a disclosed embodiment the apparatus includes at least one marker positioned in proximity to the region of interest, and wherein the processor is configured to detect the marker in the captured image so as to identify the region of interest.

In a further disclosed embodiment the processor is configured to determine an initial pupil diameter in response to the dimension of the section being set by the subject to occlude an object of known size while the subject gazes at the object in a known ambient light brightness. Typically, the processor is configured to determine a brightness of the scene in response to the captured image of the scene, and the processor is configured to determine the pupil diameter in response to the initial pupil diameter and the brightness of the scene.

In a yet further disclosed embodiment the processor is configured to determine an initial pupil diameter in response to analysis of a reflected image of the subject while the subject gazes into a mirror in a known ambient light brightness. Typically, the processor is configured to determine a brightness of the scene in response to the captured image of the scene, and the processor is configured to determine the pupil diameter in response to the initial pupil diameter and the brightness of the scene.

In an alternative embodiment the dimension of the section is determined so that the region of interest is occluded. Typically, a region surrounding the region of interest is partially occluded. A fraction of occlusion in the region surrounding the region of interest may be determined in response to the pupil diameter. The processor may be configured to derive from the captured image an image corresponding to the region surrounding the region of interest, and the projector may be configured to project the derived image onto an area of the screen surrounding the at least partially opaque section of the screen. An intensity of the projected derived image may be determined in response to the fraction of occlusion.

In a further alternative embodiment the dimension of the section is determined in response to a size of the region of interest.

The dimension of the section may be determined so that an area greater than the region of interest is occluded. Alternatively, the dimension of the section may be determined so that an area less than the region of interest is occluded.

In a yet further alternative embodiment the retaining structure is a spectacle frame. Alternatively, the retaining structure is a helmet having a head-up display.

Typically, the at least one image capturing device includes two image capturing devices capturing respective images of the scene, and the processor is configured to identify the region of interest by analysis of the respective images.

There is further provided, according to an embodiment of the present invention, a method, including:

positioning a retaining structure in proximity to an eye of a subject, the eye of the subject having a pupil with a pupil diameter;

mounting an optical combiner on the structure in front of the eye;

coating the optical combiner with a pixelated screen, having an array of variably transparent pixels;

mounting at least one image capturing device on the structure so as to capture an image of a scene viewed by the eye;

mounting a projector on the structure the projector being configured to project at least one of a portion of the captured image and a stored image onto a section of the screen at a selected location thereof;

rendering the section of the screen at least partially opaque;

selecting the location of the section in response to a region of interest in the scene identified by analysis of the captured image; and determining a dimension of the section in response to the pupil diameter.

There is further provided, according to an embodiment of the present invention, apparatus, including:

a retaining structure, configured to be positioned in proximity to an eye of a subject;

an optical combiner mounted on the structure in front of the eye;

a pixelated screen, having an array of variably transparent pixels, coating the optical combiner;

at least one image capturing device mounted on the structure configured to capture an image of a scene viewed by the eye;

a processor, configured to render a section of the screen at least partially opaque, and a projector mounted on the structure and configured to project at least one of a portion of the captured image and a stored image onto the section of the screen so that there is misalignment between the scene viewed by the eye through the combiner and the at least one portion of the captured image and the stored image.

Typically, for a scene at 50 cm from the eye, the misalignment is no more than 2 cm.

The projector may be configured to project the portion of the captured image and the stored image, in registration with each other, onto the section of the screen.

There is further provided, according to an embodiment of the present invention, apparatus, including:

a retaining structure, configured to be positioned in proximity to an eye of a subject;

an optical combiner mounted on the structure in front of the eye;

a rotator connected to the optical combiner and configured to rotate the optical combiner about an axis;

a pixelated screen, having an array of variably transparent pixels, coating the optical combiner;

at least one image capturing device mounted on the structure configured to capture an image of a scene viewed by the eye; and a processor, configured to render a section of the screen at least partially opaque, and to activate the rotator so that the optical combiner is oriented to be orthogonal to a region of interest in the scene.

The processor is typically configured to select the section of the screen so as to occlude the region of interest.

The axis may be a vertical axis.

There is further provided, according to an embodiment of the present invention, a method, including:

positioning a retaining structure in proximity to an eye of a subject;

mounting an optical combiner on the structure in front of the eye;

coating the optical combiner with a pixelated screen comprising an array of variably transparent pixels;

mounting at least one image capturing device on the structure, the device being configured to capture an image of a scene viewed by the eye;

rendering a section of the screen at least partially opaque;

mounting a projector on the structure; and configuring the projector to project at least one of a portion of the captured image and a stored image onto the section of the screen so that there is misalignment between the scene viewed by the eye through the combiner and the at least one portion of the captured image and the stored image.

There is further provided, according to an embodiment of the present invention, a method, including:

positioning a retaining structure in proximity to an eye of a subject;

mounting an optical combiner on the structure in front of the eye;

connecting a rotator to the optical combiner, the rotator being configured to rotate the optical combiner about an axis;

coating the optical combiner with a pixelated screen having an array of variably transparent pixels;

mounting at least one image capturing device on the structure, the device being configured to capture an image of a scene viewed by the eye;

rendering a section of the screen at least partially opaque; and activating the rotator so that the optical combiner is oriented to be orthogonal to a region of interest in the scene.

The present disclosure will be more fully understood from the following detailed description of the embodiments thereof, taken together with the drawings, in which:

BRIEF DESCRIPTION OF THE DRAWINGS

FIGS. 3A, 3B, and 3C are schematic diagrams illustrating the assembly in different orientations with respect to a region of interest.

DETAILED DESCRIPTION OF EMBODIMENTS

Overview

Figure 1:
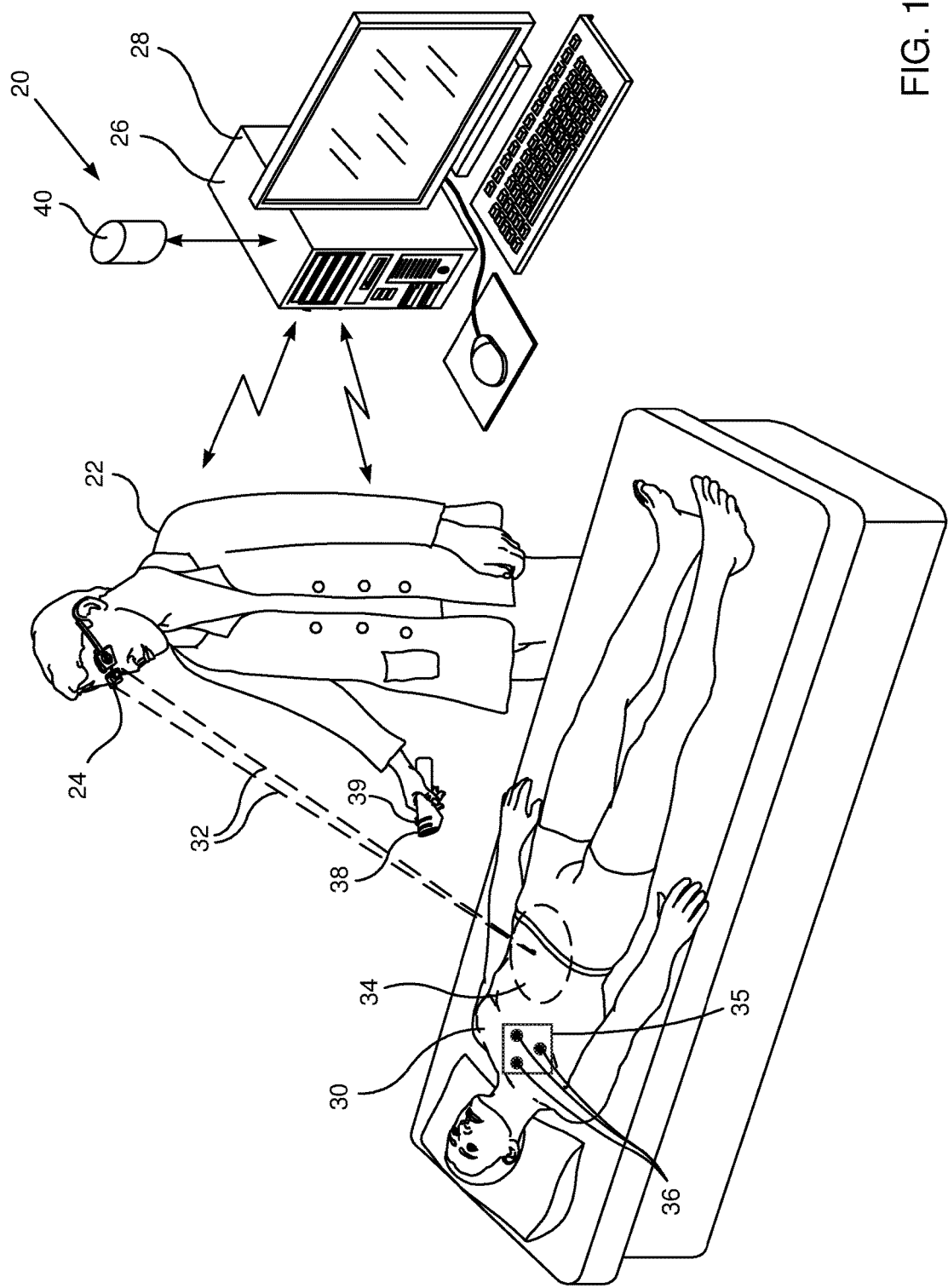
FIG. 1 schematically illustrates use of an augmented reality system, according to an embodiment of the present invention.

An embodiment of the present invention provides a near eye assembly having a retaining structure that is configured to be positioned in proximity to the eye of a user of the assembly. Typically, the retaining structure comprises a spectacle frame. Alternatively, the retaining structure comprises a head up-display which may be mounted on a helmet worn by the assembly user.

An optical combiner is mounted on the structure in front of the user eye. Typically, two combiners are mounted, one in front of each eye. The optical combiner at least partially transmits elements of a scene in front of the assembly through the combiner. In addition, the optical combiner may receive a visible radiation transmission derived from a scene, and/or a visual transmission such as a presentation of data or a marker, and redirects the transmission back to the user's eye.

A pixelated screen, comprising an array of variably transparent pixels, coats the optical combiner. Typically, the pixels are liquid crystal display (LCD) pixels.

There is at least one image capturing device, typically two such devices, one for each eye, mounted on the structure. The capturing device is typically a visible spectrum camera that is configured to capture an image of a scene viewed by the user's eye.

A projector, typically a micro-projector, is mounted on the structure. Typically two projectors, one for each eye, are mounted on the structure. The projector is configured to project at least one of a portion of the captured image as a video, as well as a stored image, onto a section of the screen that a processor renders at least partially opaque. The at least partially opaque section is also referred to herein as an occlusion mask, or just as a mask.

The processor is configured to select the location of the section in response to a region of interest in the scene identified by analysis of the captured image. Typically, at least one marker is positioned near the region of interest, and the processor analyzes the captured image to locate the marker and so identify the region of interest. Rendering the section opaque occludes the region of interest from the user's eye.

In addition, the processor determines a dimension of the section, typically, in the case of the section being circular, the diameter of the section. The dimension is determined in response to the pupil diameter.

By setting the dimension of the section according to the pupil diameter, embodiments of the present invention more exactly control the area of the region of interest that is occluded. In addition, because of the finite size of the pupil, there is a region surrounding region of interest that is partially occluded. In some embodiments the processor operates the micro-projector to overlay relevant portions of the captured image on the partially occluded region, so as to compensate for the partial occlusion.

As stated above, a portion of the captured image may be projected as a video onto the occlusion mask. In some embodiments the captured image portion video corresponds to the occluded region of interest. There is a non-occluded region surrounding the occluded region of interest, and this non-occluded region is visible to the user through the combiner. In embodiments of the invention the video and the visible non-occluded region are typically not in accurate registration, due to slight inevitable movements of the display relative to the user's eye.

In some embodiments a stored image, such as an image of a tool, is overlaid on, and in accurate registration with, the occluded region video.

The inventors have found that registering the stored image with the video, even though the video is not fully registered with the surrounding visible region, provides an acceptable image for the user. The inventors have found that for a non-occluded region that appears to be 50 cm from the user's eye, the video and the non-occluded region may be out of registration by up to 2 cm, while still being acceptable to the user.

Thus, in contrast to prior art augmented reality systems, embodiments of the present invention are configured to operate with mis-alignment between the visible portion of a scene and an augmented reality portion of the scene. However, there is no mis-alignment between elements within the augmented reality video, i.e., the elements projected onto the occlusion mask.

In some embodiments, the optical combiner may be rotated about an axis by the processor. In the case of two combiners, they may be independently rotated about respective axes. The independent rotations may be used to orient both combiners so that each is orthogonal to the direction of gaze of the user's eyes.

System Description

Reference is now made to FIG. 1, which schematically illustrates use of an augmented reality system 20, according to an embodiment of the present invention. By way of example and for simplicity, in the following description system 20 is assumed to be used in a medical procedure during part of which the user of the system is being mentored. However, it will be understood that embodiments of the present invention may be used in non-medical and/or non-mentoring situations, such as in operating a video game, in simulating a real-world event, or in providing an aid to navigation.

System 20 is operated by a medical professional 22, who wears an augmented reality assembly 24, described in more detail below with respect to FIGS. 2A-2D. While assembly 24 may be incorporated for wearing into a number of different retaining structures on professional 22, in the present description the retaining structure is assumed to be similar to a pair of spectacles. Those having ordinary skill in the augmented reality art will be aware of other possible structures, such as incorporation of the augmented reality assembly into a head-up display that is integrated into a helmet worn by the user of system 20, and all such structures are assumed to be comprised within the scope of the present invention.

System 20 comprises and is under overall control of a processor 26. In one embodiment processor 26 is assumed to be incorporated within a stand-alone computer 28, and the processor typically communicates with other elements of the system, including assembly 24, wirelessly, as is illustrated in FIG. 1. Alternatively or additionally, processor 26 may use optical and/or conducting cables for communication. In further alternative embodiments processor 26 is integrated within assembly 24, or in the mounting of the assembly. Processor 26 is typically able to access a database 40, wherein are stored images and other visual elements used by system 20. Software enabling processor 26 to operate system 20 may be downloaded to the processor in electronic form, over a network, for example. Alternatively or additionally, the software may be provided on non-transitory tangible media, such as optical, magnetic, or electronic storage media.

The medical procedure exemplified here is on a patient 30, and during the procedure professional 22 gazes along gaze directions 32 at a region of interest (ROI) 34. ROI 34 typically, but not necessarily, comprises a portion of the patient. In some embodiments one or more ROI acquisition markers 35, comprising marker elements 36, are positioned in, and/or in proximity to, ROI 34, and the functions of such markers are described below. Typically there are at least three marker elements 36 for a given marker 35. In a disclosed embodiment the size of ROI 34 may be predefined by professional 22, for example based on a computerized tomography (CT) image of the patient, and the position of the ROI may also be a predefined distance to the right and a predefined distance below the marker. In an alternative embodiment marker elements 36 of marker 35 define ROI 34 to be a region within a surface having elements 36 in the perimeter of the surface. Typically, a margin in an approximate range of 1-5 cm is added to ROI 34 to compensate for mis-alignment between a video projection and a directly viewed scene, described in more detail below.

During the procedure professional 22 may use a surgical device 38, such as a surgical knife, to perform part of the procedure. Typically device 38 comprises one or more identifying elements 39 which may be used to track the device.

Figure 2A:
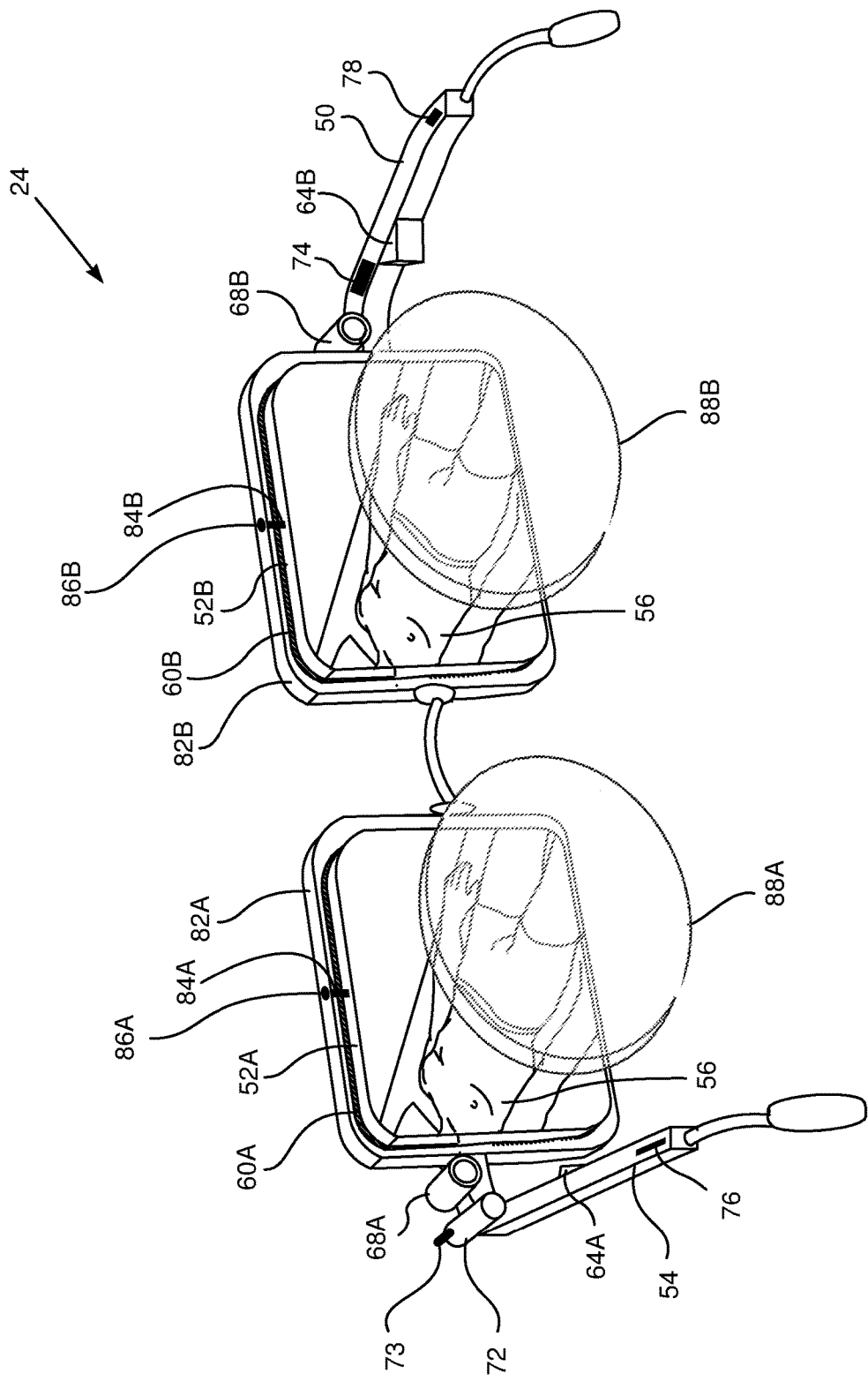
FIGS. 2A-2E are schematic diagrams illustrating an augmented reality assembly, as well as functions that may be implemented in the assembly, according to an embodiment of the present invention.

FIGS. 2A-2E are schematic diagrams illustrating assembly 24, as well as functions that may be implemented in the assembly, according to an embodiment of the present invention. FIG. 2A illustrates assembly 24 with none of the active elements of the assembly, i.e., those elements requiring power, operating. As stated above, assembly 24 is configured, by way of example, as a pair of spectacles 50. Similar elements of each "half" of the pair of spectacles are referred to generically by an identifying numeral, and the similar elements are differentiated as necessary by adding a letter to the numeral. Thus spectacles 50 comprise planar optical combiners 52, comprising combiners 52A and 52B in front of, respectively, the left and right eyes of professional 22. Optical combiners 52 are mounted on a retaining structure 54 which holds elements of assembly 24, and which is herein assumed to comprise a spectacle frame, so that structure 54 is also referred to herein as frame 54.

In some embodiments, combiner frames 82A and 82B are fixed to retaining structure 54 and vertical retaining rods 84A and 84B attached to the combiner frames support the optical combiners, so that the combiners are able to rotate about vertical axes defined by the rods. Retaining rods 84A and 84B, and thus combiners 52A and 52B, may be rotated independently of each other about their vertical axes by respective motors 86A and 86B, fixed to frames 82A and 82B. Motors 86, typically stepper motors, are controlled by processor 26 so as to rotate their attached combiners to known, typically different, fixed orientations with respect to their respective combiner frames.

Each optical combiner 52 is configured to at least partially transmit elements of a scene through the combiner, so that a portion 56 of patient 30 (FIG. 1) is assumed to be directly visible through each combiner 52. In addition, each optical combiner 52 is configured to receive a visible radiation transmission derived from a scene, and/or a visual transmission such as a presentation of data or a marker, and to redirect or reflect the transmission back to the eye of professional 22. The redirection is such that the scene and/or data or marker presented to the professional appears to be at a distance between the near and far points of vision of the professional. Thus, any given section of the optical combiner may combine directly visible material with redirected or reflected material, and provide this combined material to the eye of the user. More detail of the functioning of combiners 52 is provided below.

Optical combiners of various types are known in the art. One known type uses a semi reflective surface which transmits an image from an image source after it has passed through a set of lenses which correct deformations caused by the semi reflective surface of the combiner. Another known type uses a waveguide which projects the image directly to the eye of the viewer. Herein, by way of example, combiners 52 are assumed to be of the waveguide type.

In one embodiment, combiners 52 comprise LUMUS DK 32 see through glasses, produced by Lumus Optical of Rechovot, Israel.

Generally similar pixelated variable transparency screens 60A and 60B respectively coat a rear side, i.e., the side away from the eyes of professional 22, of combiners 52A, 52B. Screens 60 are active elements of system 20 and are formed of an array of pixels, the opacity of each of the pixels being controlled by processor 26.

Screens 60 are typically, but not necessarily, liquid crystal displays (LCDs) formed of a rectangular array of liquid crystal pixels. Alternatively, screens 60 are formed of MEMS (microelectromechanical systems). Further alternatively, screens 60 are formed of polymer dispersed liquid crystals (PDLCs). In the following description, by way of example, screens 60 are assumed to be formed of LCDs. LCD display pixels can typically be switched between an opaque state, where approximately 95% of the incoming light is blocked and 5% is transmitted, and a transparent state where approximately 60% of the incoming light is blocked and 40% is transmitted. The LCDs then have a transmission contrast ratio of 1:8.

Fixedly attached to arms of frame 54 are generally similar micro-projectors 64A and 64B. Each micro-projector is located and oriented so as to be able to project onto respective combiner 52A and 52B, a scene, and/or a visual indication, in a form suitable for redirection by the combiners to the left or right eye of professional 22. Micro-projectors 64 are active elements, and the projected scenes/indications are provided to the micro-projectors by processor 26. The projection and redirection are configured so that the images seen by the eyes of professional 22, absent any correcting lenses, appear to be at infinity, due to parallel light coming from the combiners and entering the pupils. In some embodiments display 24 comprises correcting lenses 88A, 88B which redirect light from combiners 52A, 52B so that the images appear to be closer than infinity to the professional's eyes. The power D in diopters of the lenses defines the distance d of the images, according to the formula d=1/D, where d is in meters, and D is a negative number. Lenses 88A, 88B are typically located between the professional's eyes and the respective combiners. For simplicity, lenses 88A, 88B are not shown in other figures of the present application.

At least one image capturing device 68 is attached to frame 54. In the disclosed embodiment there are two generally similar devices 68A and 68B, respectively aligned to be approximately orthogonal to planar combiners 52A and 52B, so as to be able to capture radiation of respective images of scenes viewed by the left and right eyes of professional 22. Typically, devices 68 comprise cameras configured to capture images of scenes in the visible spectrum. The cameras may use rolling shutters, in which cases latency (of projection via micro-projectors 64) may be reduced by processing rows of images rather than complete frames of images. In some embodiments devices 68 may also capture non-visible portions of images, such as portions in the infra-red spectrum. The operation of devices 68 is controlled by processor 26.

In some embodiments of the present invention, assembly 24 comprises a sensor 72 which is configured to capture non-visible images of elements of a scene in front of assembly 24. Typically sensor 72 uses a projector 73 configured to project radiation in the non-visible spectrum detected by the sensor, and has a bandpass filter configured to block visible radiation, such as that projected by surgical lighting. Typically, sensor 72 and projector 73 operate in the near infra-red spectrum.

In some embodiments, assembly 24 comprises a manual and/or electronic control 74 which may be operated by professional 22 to move elements of the assembly in and out of the field of view of the professional. Additionally or alternatively, there may be a button or switch 78 which enables the professional to power active elements of assembly 24, such as the capturing devices and the micro-projectors. In some embodiments switch 78 may be a foot switch. Further additionally or alternatively, assembly 24 may be configured so that it can tilt downwards about a horizontal axis, at an angle up to 40° from the horizontal, so that the professional can look through the assembly when looking down.

Additionally, assembly 24 may comprise a sensor 76, such as an accelerometer, which is configured to measure an inclination of the assembly with respect to the direction of gravity, so measuring the angle of the head of the professional with respect to the vertical. Processor 26 may be configured to use readings from sensor 76 to move elements of assembly 24 in and out of the field of view of the professional, and/or to control whether micro-projectors 64 project images.

Figure 2B:
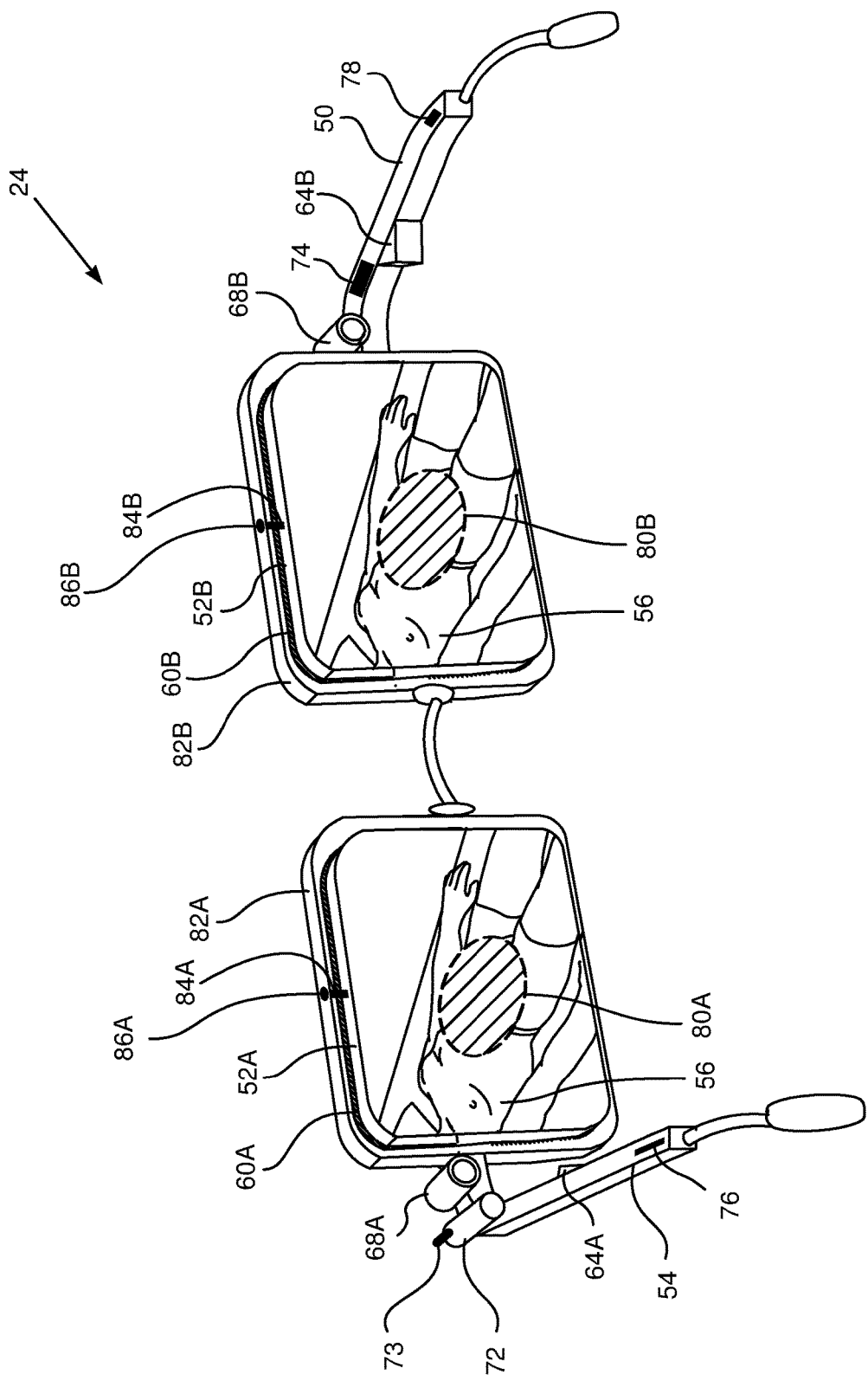

FIG. 2B schematically illustrates the appearance of assembly 24 when processor 26 activates screens 60A and 60B. As described above, each screen 60 comprises an array of pixels, and the opacity of each pixel in an individual screen may be set by processor 26. In screen 60A the processor has rendered a circular array 80A of the pixels of the screen opaque, while the remaining pixels of the screen are rendered transparent. The opacity of array 80A means that from the point of view of the left eye of professional 22, circular array 80A acts as a mask occluding corresponding features of portion 56 of the patient, so that array 80A is also referred to herein as occluding mask 80A.

Similarly in screen 60B processor 26 has rendered a circular array 80B of the pixels of the screen opaque, while the remaining pixels of the screen are rendered transparent. As for array 80A, array 80B occludes sections of portion 56 from the view of the right eye of professional 22. Thus array 80B is also referred to herein as occluding mask 80B.

Figure 2C:
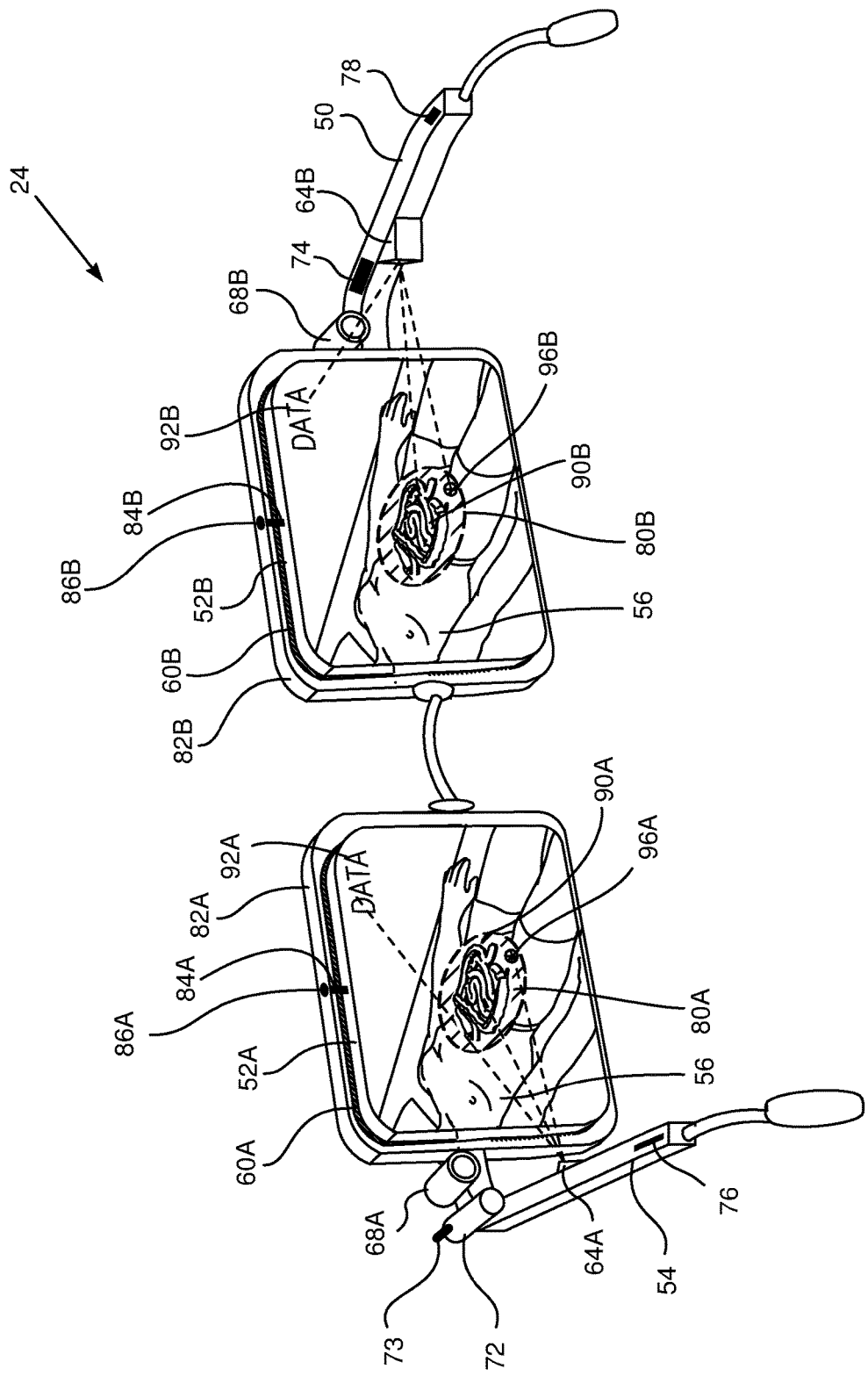

FIG. 2C schematically illustrates the appearance of assembly 24 when processor 26 activates screens 60 and micro-projectors 64A and 64B. Screens 60 are activated to provide occluding masks 80A and 80B, as described above with respect to FIG. 2B. Micro-projector 64A projects a prerecorded ultrasound image 90A of the patient's abdomen so as to overlay the image on mask 80A, and micro-projector 64B projects an image 90B of the abdomen so as to overlay it on mask 80B. Typically, although not necessarily, images 90A and 90B are the same. In some cases, for example if the images have been acquired in a stereoscopic manner or for correct 3D perception, images 90A and 90B may be slightly different, typically being slightly displaced horizontally with respect to each other. Micro-projectors 64 are configured to position images 90A and 90B on their respective masks so that, as seen by professional 22 and with −2 diopter lenses 88A, 88B present, the images are in focus at approximately 50 cm and appear to be at the location of the patient's abdomen.

In addition to projecting images 90, micro-projectors 64 also project alphanumeric data 92A and 92B onto the non-occluded region of screens 60, as well as markers 96A and 96B onto masks 80A and 80B. Images 90, data 92, and markers 96 are typically stored in database 40, and are provided from the database to micro-projectors 64 by processor 26.

In a mentoring situation images 90, the contents of data 92, and the position of markers 96 are typically under control of a tutor interacting with processor 26 while mentoring professional 22. In some cases the locations of masks 80 may also be provided to processor 26 by the tutor, although typically the locations of the masks depend upon gaze directions 32 of the professional. In a non-mentoring situation, i.e. where professional 22 alone operates system 20, locations of masks 80 are typically automatically set by processor 26, as is described below. Also in a non-mentoring situation, images 90, data 92, and markers 96 may be controlled by professional 22. It will be understood that images 90, data 92 and markers 96 are examples of non-video related visual elements that are seen by professional 22, and that the provision of such elements corresponds to an optic-based augmented reality situation implemented in system 20.

Figure 2D:
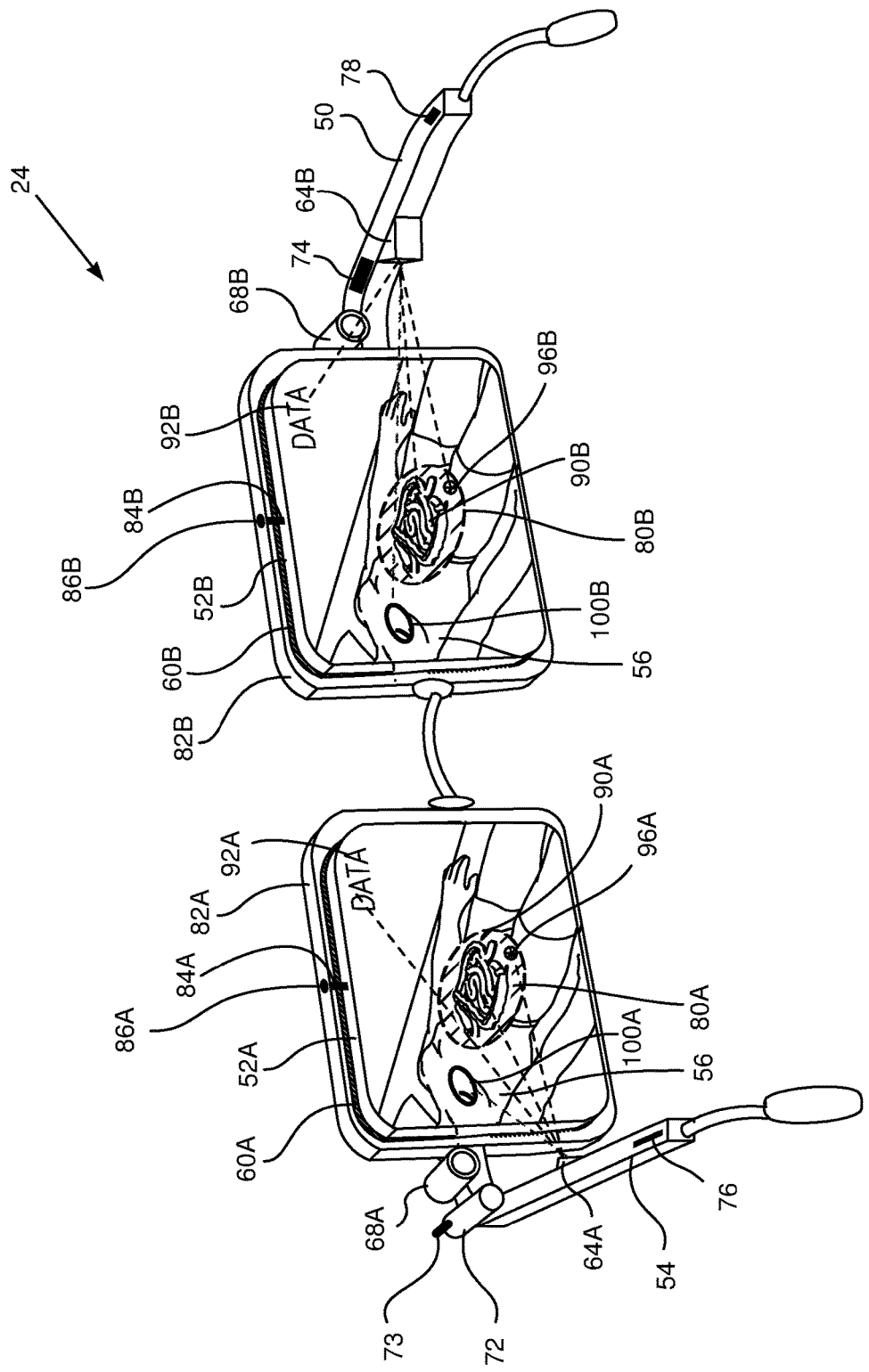

FIG. 2D schematically illustrates the appearance of assembly 24 when processor 26 activates screens 60 and micro-projectors 64, and in addition incorporates a video-based augmented reality feature into the operation of the assembly. Screens 60 and micro-projectors 64 are assumed to be activated as described above for FIG. 2C, so that masks 80, images 90, data 92 and markers 96 are in the field of view of professional 22. By way of example, the figure has been drawn to illustrate a mentoring situation, where the tutor of professional 22 wants to point to a feature of the chest of patient 30, herein assumed to comprise an unusual movement of the chest.

To point to the feature, the tutor interacts with processor 26 so that the processor enhances and emphasizes portions 100A, 100B of the video images acquired by capturing devices 68, the portions corresponding to the region of the chest where the unusual movement is occurring. Microprojectors 64A, 64B then project portions 100A, 100B onto combiners 52A, 52B. It will be understood that the enhancement of portions 100A, 100B and their projection on the respective combiners is in real-time. The enhancement may take a number of forms. For example, portions 100A, 100B may comprise a wireframe image of the region of the chest having unusual movement, and/or a false-color image of the region. Other suitable methods of real-time enhancement will be apparent to those having ordinary skill in the art, and all such methods are assumed to be within the scope of the present invention.

Figure 2E:
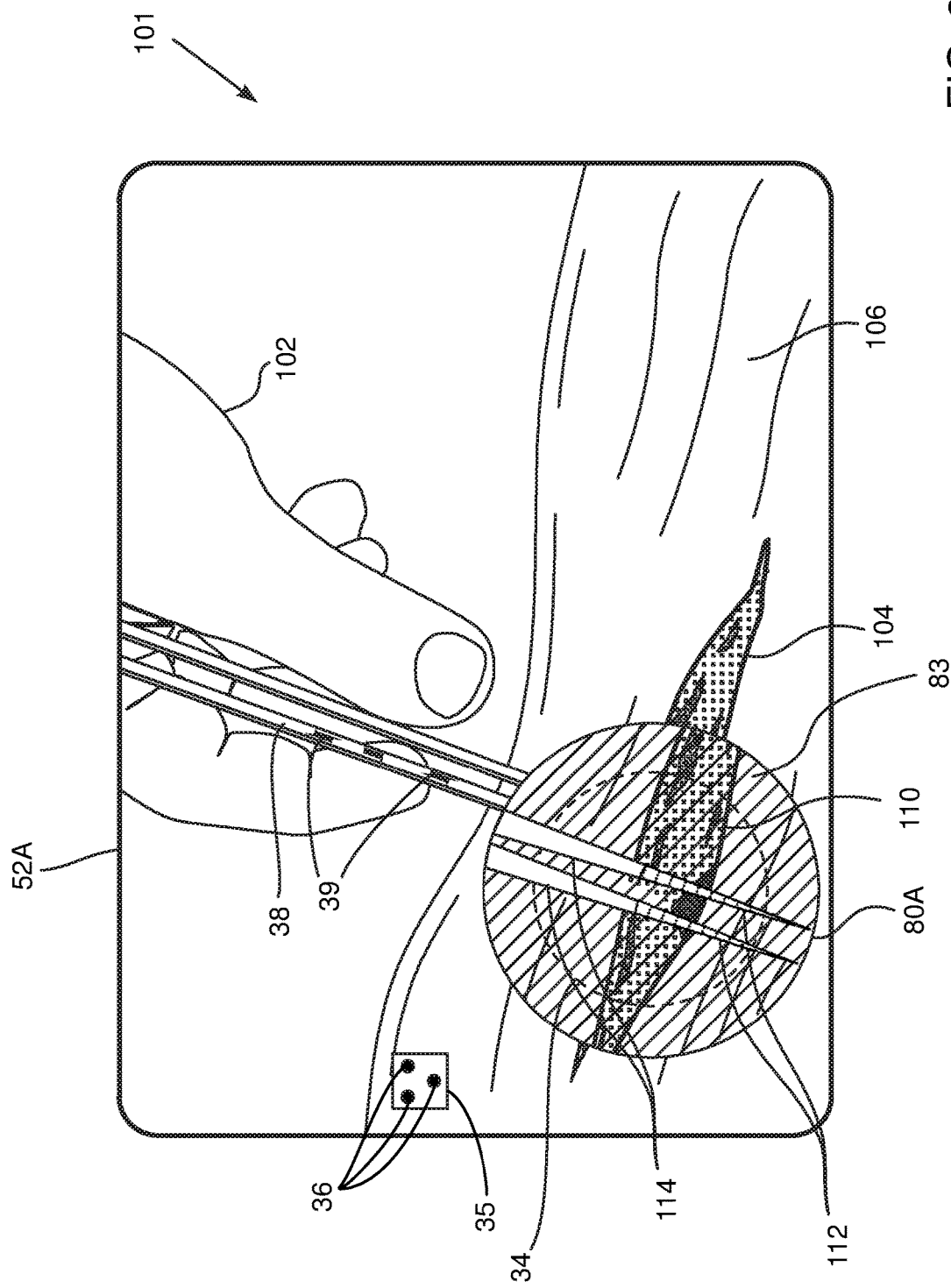

FIG. 2E schematically illustrates an overall scene 101 as seen by professional 22, during an invasive surgical procedure being performed by the professional. For simplicity, FIG. 2E illustrates the scene as it is presented on combiner 52A, and it will be understood that a substantially similar scene is presented to the professional on combiner 52B. The figure illustrates a hand 102 of professional 22 holding device 38, herein assumed to comprise a pair of tweezers, at a proximal end of the device. One or more device identifying elements 39, typically reflectors and/or radiators, are attached to the tweezers, so that processor 26 is able to identify and track device 38 using images acquired by capturing devices 68.

The professional has made an incision 104 in a portion 106 of patient 30, and ROI 34, defined by marker elements 36, is assumed to be at the location of the incision. In addition, the professional has inserted a lower portion of the distal end of device 38 into the patient so that the lower portion is no longer visible.

Processor 26 has formed mask 80A on combiner 52A so as to occlude ROI 34, and the portion of incision 104 comprised in the ROI. Mask 80A also includes a margin 83, typically corresponding to a margin of approximately 1-5 cm at the ROI. Thus, all elements of the scene outside mask 80A, comprising hand 102 and the proximal end of device 38, are directly visible through combiner 52A by the professional. However, elements of the scene within mask 80A, including a portion of incision 104 and an upper portion of the distal end of device 38 that is outside the patient, are not visible to the professional, since they are occluded by the mask.

Processor 26 overlays on mask 80A a captured image 110 of the ROI and the region corresponding to margin 83, which includes the portion of incision 104 occluded by the mask and which also includes a video image 114 of the upper portion of the distal end of device 38 (outside the patient) that has been captured by image capturing device 68. In addition, the processor overlays on the occlusion mask a stored image 112 corresponding to the lower portion of the distal end of device 38 (within the patient). Stored image 112 is a virtual elongation of image 114 and is retrieved from database 40. The section of the distal end corresponding to image 112 is not visible to capturing device 68.

The processor registers the two overlaid images, image 110 and image 112, with each other, and the registration is possible since by tracking device 38 the processor is aware of the location of the device distal end with respect to the captured image. Thus, there is no misalignment between stored image 112, corresponding to the lower portion of the distal end, and image 114 of the upper portion of the distal end, which is included in captured image 110.

However, there is typically misalignment between the two registered overlaid images 110, 112 and the directly visible portion of scene 101, including the directly visible portion of incision 104, as is illustrated in the figure. The misalignment occurs because while the captured image of the ROI is close to that seen by the professional (in the absence of the occlusion mask), it is not exactly in registration with the viewed scene. The inventors have found that a misalignment of up to 2 cm, in a scene that is 50 cm from the eye of the professional, is acceptable.

Figure 3C:
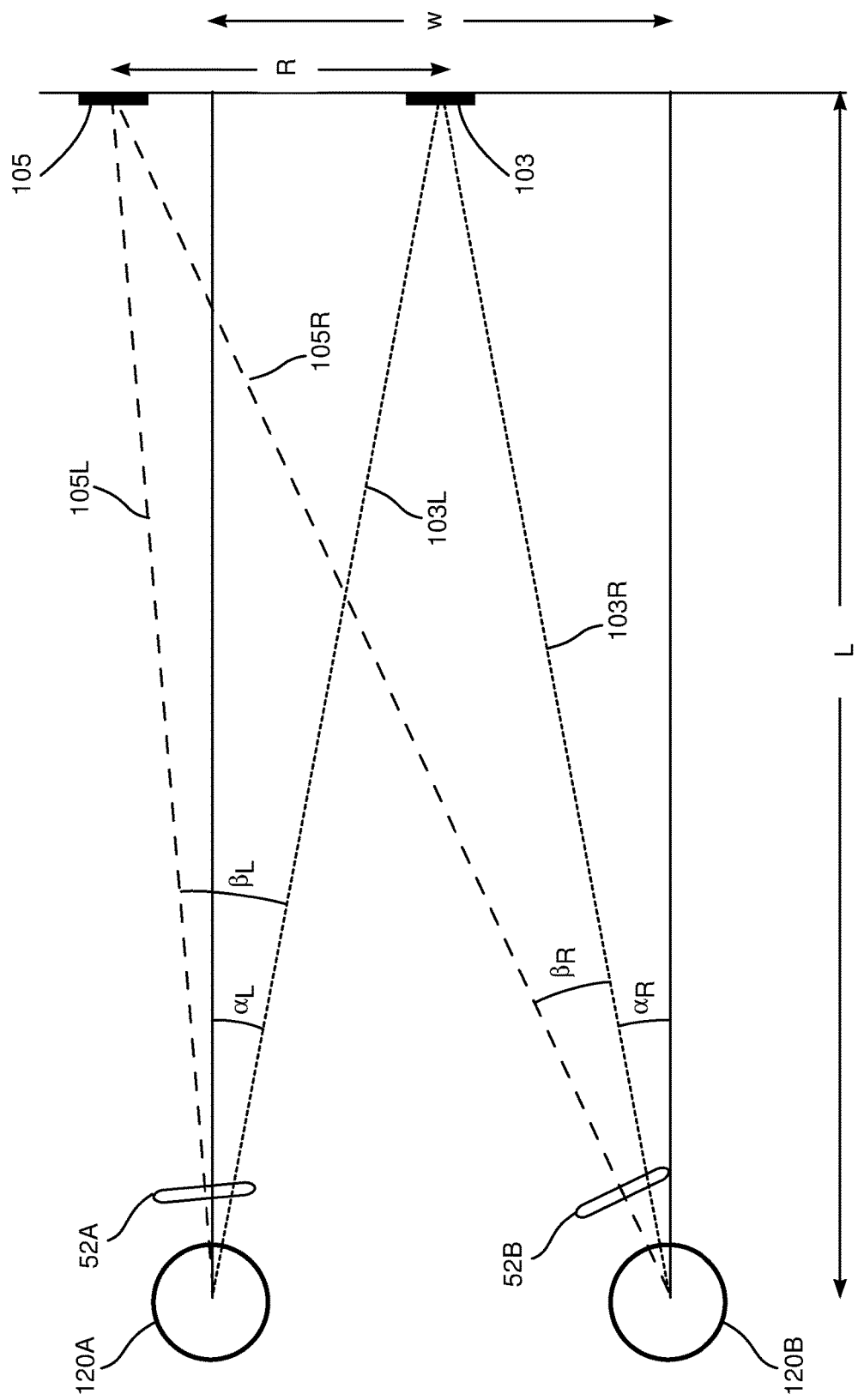
Figure 3D:
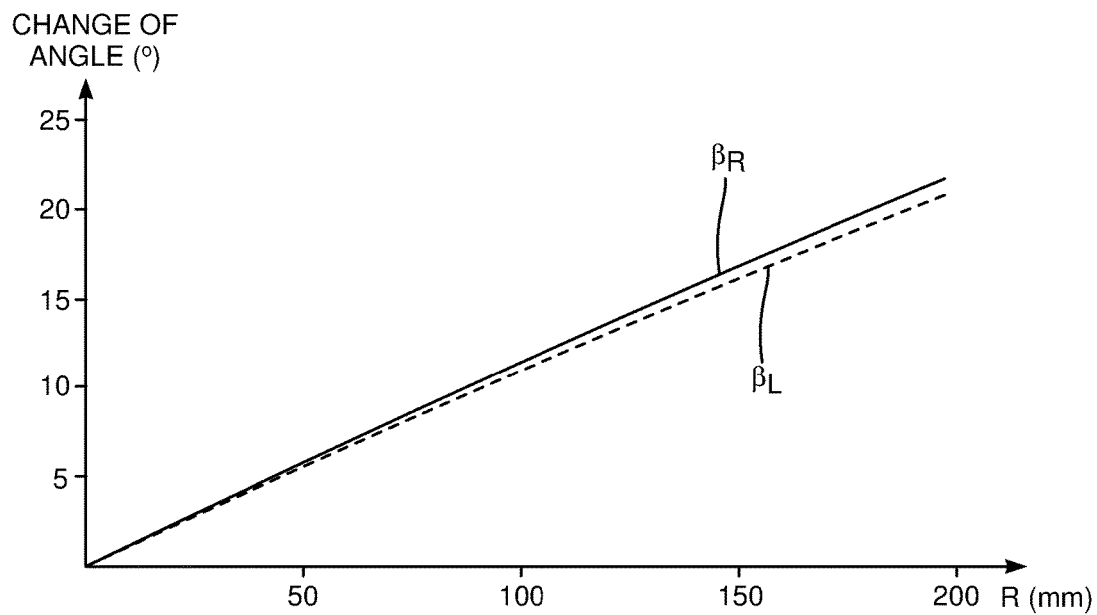
FIGS. 3D and 3E are graphs derived from the different orientations, according to an embodiment of the present invention.
Figure 3E:
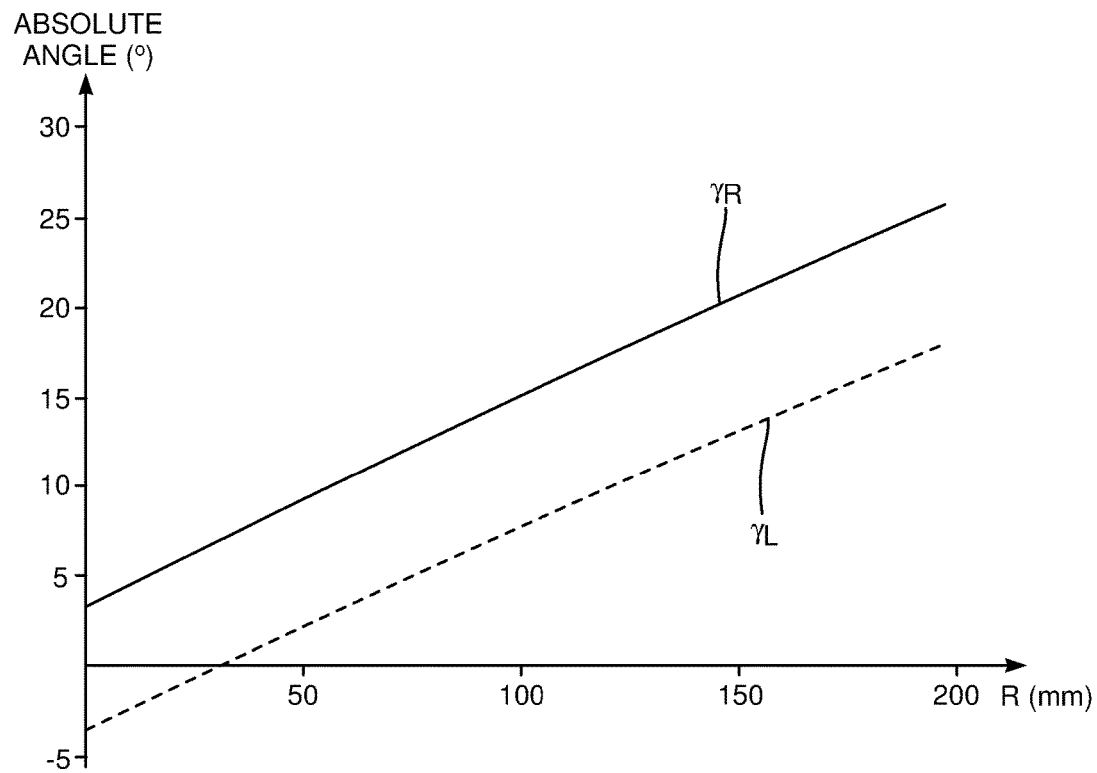

FIGS. 3A and 3B are schematic diagrams illustrating assembly 24 in different orientations with respect to ROI 34, FIG. 3C is a schematic diagram illustrating angles of the assembly for the different orientations, and FIGS. 3D, 3E are graphs of the angles, according to an embodiment of the present invention. For simplicity, combiner frames 82 are not shown in the diagrams. In FIGS. 3A and 3B processor 26 has positioned masks 80 so that they act to occlude ROI 34 from eyes 120A, 120B of professional 22, specifically from pupils 124A, 124B of the professional's eyes. FIG. 3A illustrates a situation where ROI 34 is approximately directly in front of professional 22. In this case the processor forms mask 80A' to be on a straight line with pupil 124A and ROI 34, while simultaneously forming mask 80B' to be on a straight line with pupil 124B and the region of interest.

FIG. 3B illustrates a situation where ROI 34 is not directly in front of professional 22, but is towards one side of the professional. As for the situation of FIG. 3A the processor forms mask 80A" to be on a straight line with pupil 124A and ROI 34, and forms mask 80B" to be on a straight line with pupil 124B and the region of interest. In all cases masks 80 act as occlusion masks, and, as is illustrated by the differences in the positions of the masks, the processor changes the locations of the masks to account for changes in orientation of the region of interest with respect to assembly 24.

A ring 130 surrounding ROI 34 is described in more detail below.

FIG. 3C schematically illustrates the two situations of FIGS. 3A and 3B, when ROI 34 is at a distance L from eyes 120A, 120B of the professional. Eyes 120A and 120B are separated by a distance w. For the situation of FIG. 3A, where the region of interest is directly in front of the professional, ROI 34 is at a location 103. For the situation of FIG. 3B, ROI 34 is to the left of the professional, at a location 104 that is a distance R from location 103.

For the first situation, where professional 22 is looking at location 103, the directions of gaze, $\alpha_R$, $\alpha_L$ of the professional are shown by lines 103R and 103L. $\alpha_R$, $\alpha_L$ are angles that are measured with respect to lines orthogonal to a line connecting eyes 120A, 120B, and their values are given by the following equations:

$$\alpha_L = -\arctan(w/2L), \alpha_R = +\arctan(w/2L) \quad (A)$$

For the first situation processor 26 rotates combiners 52A and 52B (for clarity the combiners are not shown in the figure for the first situation), within their respective frames 80A and 80B, so that they are orthogonal to lines 103L and 103R. Thus the orientation of the combiners to their frames is given by equations (A). For the second situation, where professional 22 is looking at location 105, the directions of gaze of the professional are shown by lines 105L and 105R. These directions are respectively changed from the "straight ahead" directions by $\beta_L$, $\beta_R$. The values of $\beta_L$, $\beta_R$ are given by equations (B):

$$\beta_L = \text{acos}\left(\frac{\sqrt{\left(\frac{w}{2}\right)^2 + L^2} - \frac{R}{\sqrt{1 + \frac{4L^2}{w^2}}}}{\sqrt{\left(R - \frac{w}{2}\right)^2 + L^2}}\right) \quad (B)$$

$$\beta_R = \text{acos}\left(\frac{\sqrt{\left(\frac{w}{2}\right)^2 + L^2} + \frac{R}{\sqrt{1 + \frac{4L^2}{w^2}}}}{\sqrt{\left(R + \frac{w}{2}\right)^2 + L^2}}\right)$$

For the second situation processor 26 rotates combiners 52A and 52B, within their respective frames 80A and 80B, so that they are orthogonal to lines 105L and 105R. Thus the orientation of the combiners to their frames is given by equations (B), and these orientations are illustrated in the figure.

FIG. 3D is a graph of angles $\beta_L$, $\beta_R$ vs. R for values of L=512 mm, w=60 mm. FIG. 3E is a graph of absolute angles $\gamma_L$, $\gamma_R$, of the angles made by combiners 52A, 52B with their frames where $$\gamma_L = \beta_L + \alpha_L, \gamma_R = \beta_R + \alpha_R \quad (C)$$

From the above equations, as well as from the graphs, it is apparent that the angles made by combiners 52A, 52B with their respective frames are different, as professional 26 gazes at a region of interest. In addition, if the professional changes his/her gaze, the changes of the combiner angles to maintain orthogonality with the gaze directions are also different.

It will be understood that calculations based on equations herein, including equations (A), (B), and (C), assume that combiners 52A, 52B transmit rays that are orthogonal to the combiners. Those having ordinary skill in the art will be able to adapt the calculations, mutatis mutandis, for situations where the combiners transmit non-orthogonal rays.

Figure 4:
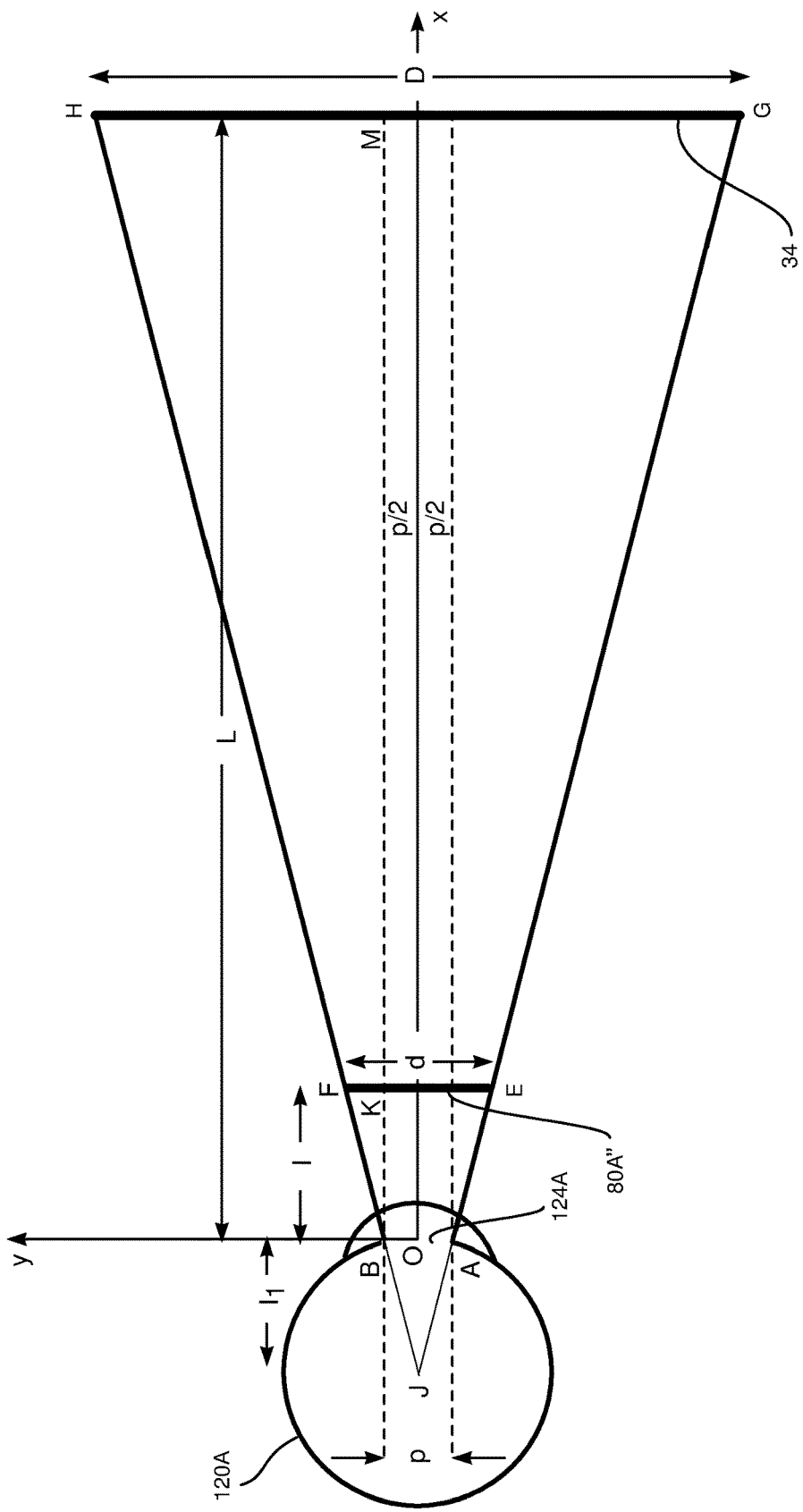
FIG. 4 is a schematic diagram illustrating derivation of the dimensions of an occlusion mask, according to an embodiment of the present invention.

FIG. 4 is a schematic diagram illustrating derivation of the dimensions of occlusion mask 80, according to an embodiment of the present invention. FIG. 4 is derived from a section of FIG. 3B, specifically the section illustrating eye 120A, with its pupil 124A, being occluded by mask 80A" while the eye is gazing at ROI 34. FIG. 4 illustrates a cross-section of the eye, the occlusion mask, and the region of interest. The figure has been drawn on xy axes with an origin O of the axes at the center of pupil 124 and the directions of the x and y axes being respectively orthogonal to and in the plane of the pupil. Mask 80A" and ROI 34 are assumed to be orthogonal to, and to be symmetrically disposed with respect to, the x-axis. Pupil 124 is assumed to be substantially circular. For simplicity, mask 80A" and ROI 34 are also assumed to be substantially circular. However, those having ordinary skill in the art will be able to adapt the following description, mutatis mutandis, for regions of interest and occlusion masks that are non-circular, so that the scope of the present invention is assumed to comprise both circular and non-circular regions of interests and masks.

The diagram has been drawn assuming that mask 80A" just completely occludes ROI 34. Thus a ray HB, from an upper edge H of ROI 34 to an upper edge B of pupil 124A touches an upper edge F of mask 80A". Similarly, a ray GA, from a lower edge G of ROI 34 to a lower edge A of pupil 124A touches a lower edge E of mask 80A". Rays HB and GA are assumed to cross at an imaginary point J. A line from upper pupil edge B parallel to the x-axis cuts mask 80A" at K and ROI 34 at M.

In the description below:

p is the apparent diameter of pupil 124A, as measured externally to eye 120A, corresponding to AB; and d is the diameter of mask 80A", corresponding to EF; $d=d_1$ for a realistic case of p>0, $d=d_0$ is the diameter of the mask for a theoretical "pinhole" case of p=0.

In addition,

D is the diameter of ROI 34 (which is occluded by mask 80A"), corresponding to GH;

L is the distance from pupil 124A to ROI 34;

$l_1$ is the distance from pupil 124A to point J; and l is the distance from pupil 124A to mask 80A".

In FIG. 4 $\triangle JFE ||| \triangle JHG$, so that $$\frac{d}{D} = \frac{l + l_1}{L + l_1} \quad (1)$$

From equation (1), $$d = \frac{l + l_1}{L + l_1} \cdot D \quad (2)$$

If $l_1=0$, (for the theoretical case of p=0), then $$d = d_0 = \frac{l}{L} \cdot D \quad (3)$$

If $l_1>0$, for the realistic case of p>0, then $$d = d_1 = \frac{l + l_1}{L + l_1} \cdot D \quad (4)$$

$\triangle BFK ||| \triangle BHM$, so that $\dfrac{FK}{BK} = \dfrac{FM}{BM}$ (5)

For p>0 (so $d=d_1$) and substituting values of $d_1$, p, l, and L for FK, BK, FM, and BM in equation (5) gives:

$$\frac{\frac{d_1}{2} - \frac{p}{2}}{l} = \frac{\frac{D}{2} - \frac{p}{2}}{L} \quad (6)$$

Equation (6) rearranges to:

$$d_1 = \frac{l(D - p)}{L} + p \quad (7)$$

Equation (7) gives dimensions of mask 80A", i.e., its diameter $d_1$, in terms of the diameter D of ROI 34, the distance l of the mask from the pupil, the diameter of the pupil, and the distance L of the ROI from the pupil.

For typical values of l=2 cm, L=50 cm, p=0.3 cm, and D=15 cm the diameter of mask 80A" to just give complete occlusion is, from equation (7), approximately 0.9 cm. For the same values but with p=0.15, the mask diameter is approximately 0.7 cm.

While, as described above, mask 80A" completely occludes ROI 34, there are regions outside ROI 34 that are partly occluded by the mask. The partial occlusion follows from the finite, non-zero diameter of the pupil of eye, in the example described here pupil 124A, and is described in more detail with reference to FIG. 5 below.

Figure 5:
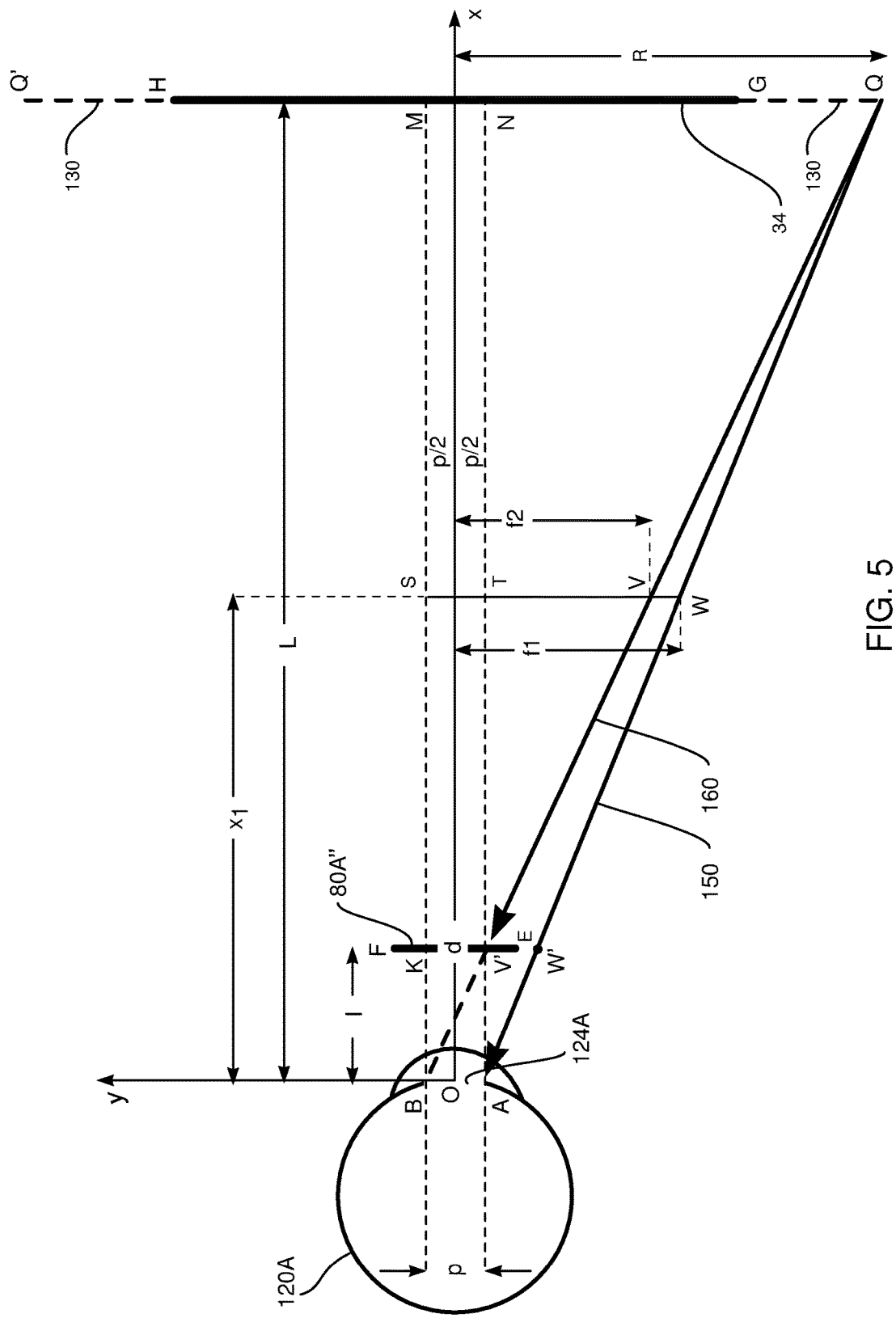
FIG. 5 is a schematic diagram illustrating partial occlusion of an area around the region of interest, according to an embodiment of the present invention.

FIG. 5 is a schematic diagram illustrating partial occlusion of an area around ROI 34, by mask 80A", according to an embodiment of the present invention. FIG. 5 is based upon FIG. 4, but for clarity some of the elements of FIG. 4 are omitted in FIG. 5, while other elements are added in. Thus, a line through point A, parallel to the x-axis, cuts ROI 34 at N. A point Q, lying in the same plane as ROI 34, and at a distance R from the x-axis, is assumed to project two rays—a lower ray 150 which touches lower edge A of the pupil, and an upper ray which, but for the presence of mask 80A", would touch upper edge B of the pupil. Point Q is thus partly occluded by mask 80A".

In FIG. 5 at a distance $x_1$ from the pupil lower ray 150 is assumed to be a distance $f1(x_1)$ from the x-axis, and upper ray 160 is assumed to be a distance $f2(x_1)$ from the x-axis. A line parallel to the y-axis, at $x_1$, cuts BM at S, AN at T, upper ray 160 at V and lower ray 150 at W. Upper ray 160 cuts mask 80A" at V', and lower ray 150 cuts a plane containing the mask at W'.

At mask 80A" the distances of lower ray 150 and of upper ray 160 from the x-axis are respectively f1(l) and f2(l), and the width of the beam between the upper and lower rays is:

$$f1(l) - f2(l) \quad (8)$$

From the diagram,
partial occlusion occurs if:

$$f1(l) > \frac{d}{2} \text{ and } f2(l) < \frac{d}{2} \quad (9)$$

no occlusion occurs if:

$$f2(l) \geq \frac{d}{2} \quad (10)$$

and full occlusion, corresponding to the situation illustrated by FIG. 4, occurs if:

$$f1(l) \leq \frac{d}{2} \quad (11)$$

From expressions (8) and (9), and inspection of FIG. 5, an equation for the fraction $F_{2D}$ of occlusion occurring is:

$$F_{2D} = \frac{\frac{d}{2} - f2(l)}{f1(l) - f2(l)} \quad (12)$$

(The subscript 2D indicates that the fraction considered here is for the two-dimensional case illustrated in FIGS. 4 and 5. A fraction for the three-dimensional case is referred to below.)

Since $\triangle ATW \text{III} \triangle ANQ$ (13)

$$f1(l) = \frac{1}{L}\left(R - \frac{p}{2}\right) + \frac{p}{2}$$

Since $\triangle BSV \text{III} \triangle BMQ$ (14)

$$f2(l) = \frac{1}{L}\left(R + \frac{p}{2}\right) - \frac{p}{2}$$

From equations (13 and (14) the diameter of the cone cross-section from Q at mask 80A", which is f1(l)-f2(l), is given by:

$$f1(l) - f2(l) = V'W' = p\left(1 - \frac{l}{L}\right) \quad (15)$$

Substituting equations (14) and (15) into equation (12) gives the following expression for $F_{2D}$:

$$F_{2D} = \frac{V'E}{V'W'} = \frac{\frac{d}{2} - \frac{l}{L}\left(R + \frac{p}{2}\right) + \frac{p}{2}}{p\left(1 - \frac{l}{L}\right)} \quad (16)$$

Inspection of equation (16) indicates that the fraction of occlusion at point Q is a function of pupil diameter p, and also decreases linearly as R increases.

HG is a cross-section of circular ROI 34, so that it will be understood that GQ is a cross-section of a circular, partially occluded circular ring 130 surrounding ROI 34. As illustrated in FIG. 5, there is a point Q', having the same distance R as Q from the x-axis (but on the opposite side of the axis), and in the same plane as ROI 34, so that HQ' is also a cross-section of ring 130.

The rays from point Q define a cone of rays emanating from Q, and this cone cuts mask 80A" in a circle having a diameter V'W', the diameter being given by equation (15). The cutting of mask 80A" by the cone of rays from Q is described with reference to FIG. 6 below.

Figure 6:
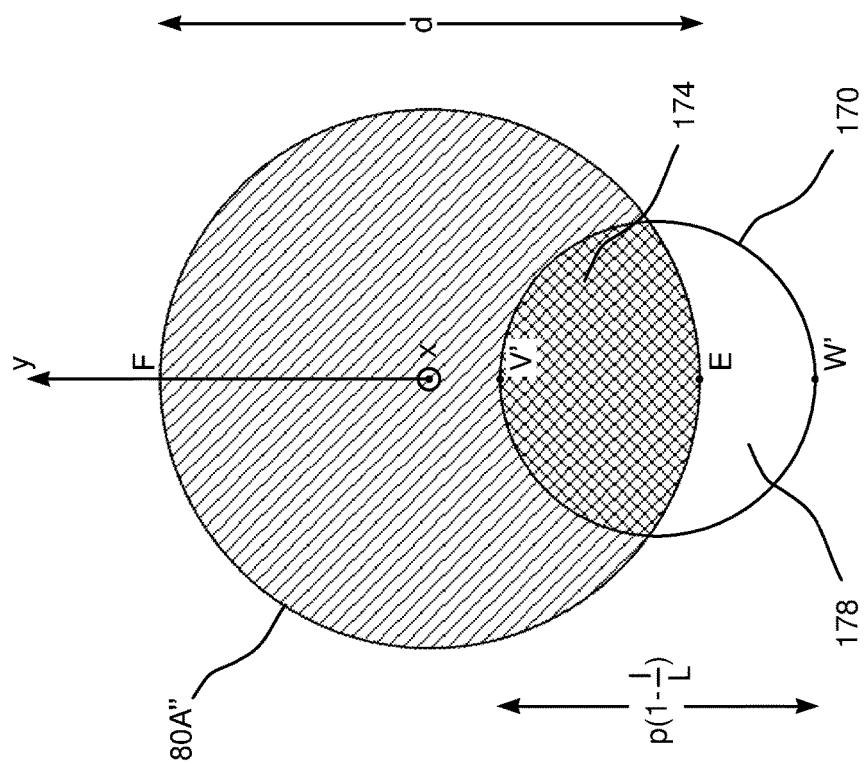
FIG. 6 illustrates an occlusion mask, according to an embodiment of the present invention.

FIG. 6 illustrates mask 80A" drawn in a plane orthogonal to the x-axis, according to an embodiment of the present invention. A circle 170, which has a diameter given by equation (15), is the circle cutting the plane containing mask 80A". A portion 174 of this circle is occluded by circular mask 80A", and a portion 178 is transmitted. The expression for the two-dimensional fraction of occlusion $F_{2D}$ given by equation (16) corresponds to analysis along a line FV'EW'.

There is a corresponding equation for a three-dimensional fraction of occlusion $F_{3D}$, given by the following expression:

$$F_{3D} = \frac{A}{A_L} \quad (17)$$

where A is the area of portion 174, and
$A_L$ is the area of circle 170.
$F_{3D}$ may also be written as:

$$F_{3D} = \frac{A}{A_L} \quad (18)$$

-continued $$= \frac{\alpha_1 \frac{D_L^2}{4} + \alpha_2 \frac{d^2}{4} - M \frac{D_L}{2}\sin(\alpha_1)}{\pi \frac{D_L^2}{4}}$$

$$= \frac{1}{\pi p^2 \left(1-\frac{l}{L}\right)^2} \left( a\cos\left(\frac{p^2\left(1-\frac{l}{L}\right)^2 + 4\left(R\frac{l}{L}\right)^2 - d^2}{4R\frac{l}{L}p\left(1-\frac{l}{L}\right)}\right) \right.$$

$$p^2\left(1-\frac{l}{L}\right)^2 + a\cos\left(\frac{d^2 + 4\left(R\frac{l}{L}\right)^2 - p^2\left(1-\frac{l}{L}\right)^2}{4R\frac{l}{L}d}\right)d^2 -$$

$$\left. 2R\frac{l}{L}p\left(1-\frac{l}{L}\right)\sin\left(a\cos\left(\frac{p^2\left(1-\frac{l}{L}\right)^2 + 4\left(R\frac{l}{L}\right)^2 - d^2}{4R\frac{l}{L}p\left(1-\frac{l}{L}\right)}\right)\right)\right)$$

From equation (18), $F_{3D}$ is a function of pupil diameter p, and the equation provides numerical values of $F_{3D}$ for selected values of d, R, p, l, and L.

Figure 7:
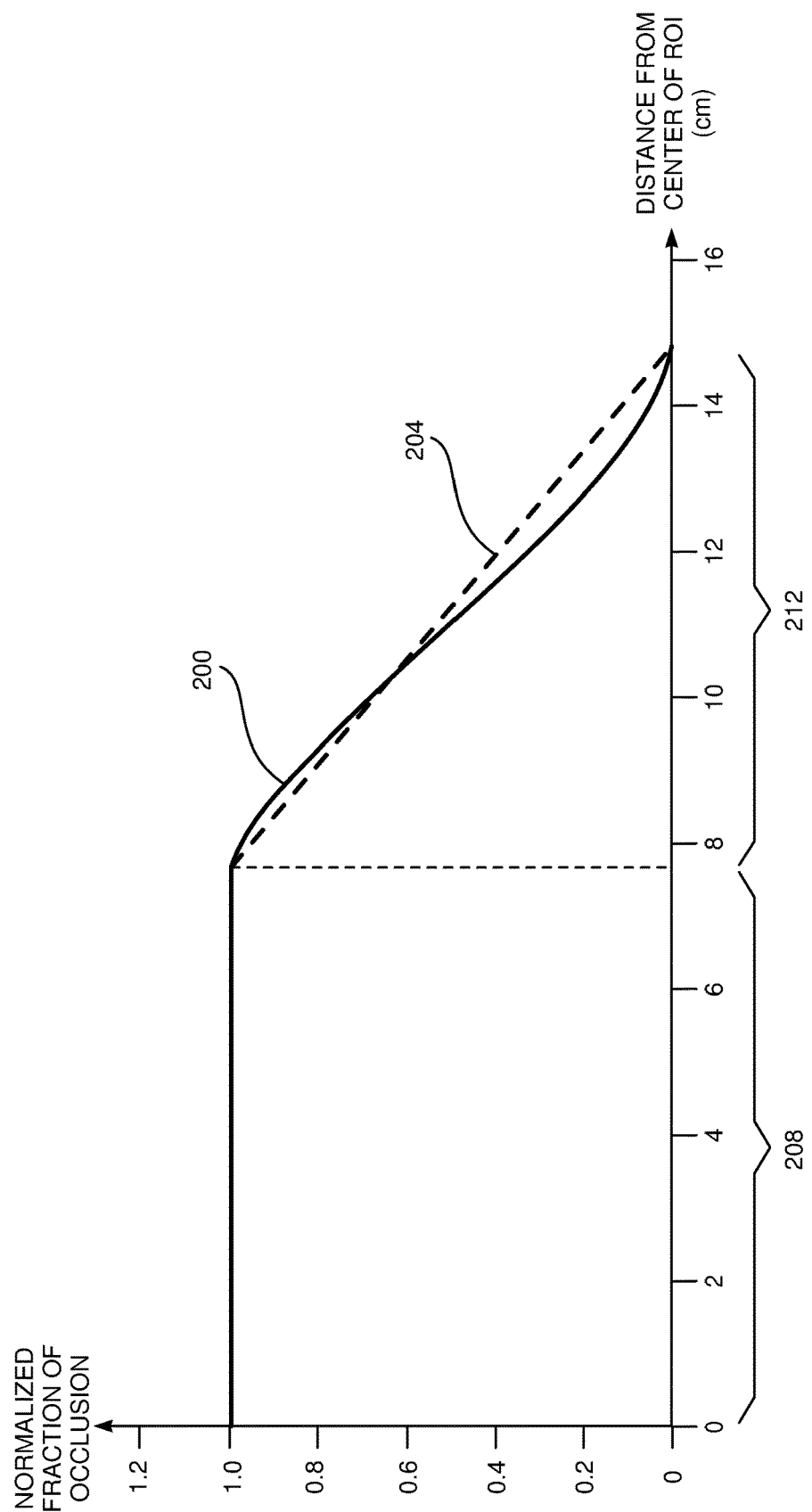
FIG. 7 illustrates graphs of occlusion vs. distance, according to an embodiment of the present invention.

FIG. 7 illustrates graphs of occlusion vs. distance, according to an embodiment of the present invention. The graphs have been drawn assuming the following values:

L=50 cm
l=2 cm
P=0.3 cm
D=15 cm

From equation (7) the diameter of the occlusion mask to fully occlude an ROI with diameter D of 15 cm is d=0.888 cm. The graphs of FIG. 7 have been drawn with d set at 0.894 cm.

From equation (15) the diameter of circle 170 is 0.288 cm, so that the value of the area $A_L$ of the circle is 0.065144 cm$^2$.

A solid line graph 200 illustrates the full and partial occlusion vs. distance (from the center of the ROI) for the three-dimensional case comprising equation (18). The measurements of occlusion have been normalized, so that for an LCD screen a full occlusion of 95% is normalized to 1, and a full transparency (of 60% occlusion) is normalized to 0. A broken line graph 204 illustrates the full and partial occlusion vs. distance for the two-dimensional case comprising equation (16). As is apparent from both graphs, there is full occlusion, for a mask of diameter d=0.894 cm, for a region 208 up to approximately 8 cm from the center of the ROI, and partial occlusion in a region 212 from approximately 8 cm to approximately 15 cm. The fraction of partial occlusion decreases monotonically in region 212.

Figure 8:
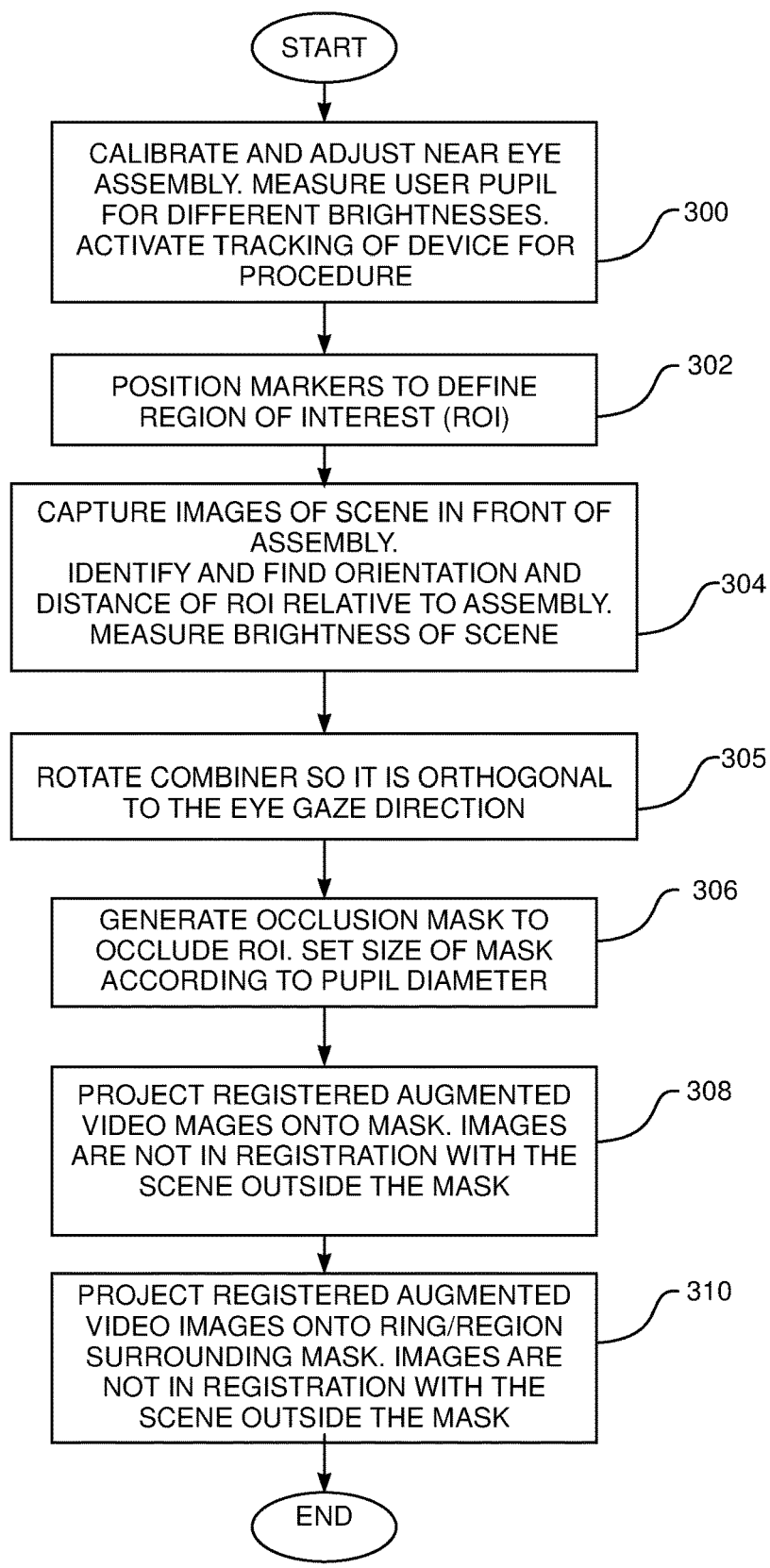
FIG. 8 is a flowchart of steps performed in operation of the augmented reality system, according to an embodiment of the present invention.

FIG. 8 is a flowchart of steps performed in operation of system 20, according to an embodiment of the present invention. The steps are assumed to be performed by processor 26 and, as necessary, professional 22 for use in a procedure on patient 30 performed by the professional using device 38 (FIG. 1). In an initial calibration step 300, frame 54 is adjusted to center combiners 52 with respect to the eyes of the professional. The sizes of the combiners and the distances of the combiners from the eyes of the professional are also measured and recorded by the processor (the use of the measurements is described further below). In step 300 assembly 24 is calibrated, i.e. optical elements of the assembly are registered with each other. Thus, devices 68 are oriented on frame 54 to capture generally similar images from the region in front of combiners 52. If sensor 72 is present it is also aligned to capture a corresponding non-visible image from the region.

Processor 26 also orients the images from micro-projectors 64, by registering the images projected by the micro-projectors onto combiners 52 with the scene viewed by professional 22 through the combiners. The registration may be accomplished by the professional viewing a scene through combiners 52, together with an image of the same scene as it is captured by devices 60 and projected by the micro-projectors onto the combiners. The professional then adjusts the orientation of the micro-projectors and/or the capturing devices so that the projected image and the viewed scene coincide.

Typically the registration and adjustment of the micro-projectors and the capturing devices is performed for different regions of combiners 52, such as the left and right peripheral regions, the upper and lower peripheral regions, and a central region. In addition, the registration and adjustment may be performed for different scenes according to the distance of the scene from the combiner, such as a scene of relatively near elements, typically up to 1 m from the combiner, and a scene of relatively far elements, typically greater than 1 m from the combiner. The registrations and adjustments of the micro-projectors and the capturing devices are typically different for the different regions of the combiners, as well as for scenes at different distances from the combiners. Processor 26 stores the different registration data acquired during the calibration step for use when the professional is using assembly 24.

During the calibration step the sizes of the pupils of the eyes of professional 22 are measured. In one embodiment professional 22 gazes at a circular object of a known diameter and at a known distance from the professional, and processor 26 presents an occlusion mask on screens 60 to the professional. The professional then adjusts a diameter of the occlusion mask until complete occlusion of the object is achieved. As is apparent from equation (7), the diameter of the completely occluding mask provides a value for the pupil diameter, since $d_1$, l, L and D (terms in equation (7)) are all known.

Alternatively or additionally, the professional may look into a mirror while image capturing devices 60 acquire images of the reflected scene, in this case the professional wearing assembly 24. Processor 26 analyzes the acquired images, by processes that are well known in the art, to identify the pupils of the professional as well as the outlines of combiners 52. The processor then compares the diameters of the pupils with the known dimensions of the combiners, so as to determine values for the diameters.

The measurements of the pupil diameters are taken for different ambient light brightnesses, and the ambient brightness values may be determined from the signal levels of the images acquired by devices 68. Processor 26 stores the values of the pupil diameters, and the corresponding brightness levels.

As stated above, processor 26 is configured to track device 38, using the one or more identifying elements 39 (FIG. 1). In calibration step 300 the processor initiates tracking of device 38, and professional 22 confirms that the tracking is acceptable.

In an ROI defining step 302, ROI acquisition marker 35 (FIG. 1) is positioned on patient 30, so as to define a region of interest of the patient selected by the professional, herein assumed to be ROI 34. As explained above, marker elements 36 of marker 35 define the position of ROI 34, and the size of the ROI may be defined by the professional. Typically there are at least three marker elements 36, although more may be used, and characteristics of the elements, such as their color and/or shape, are selected so that they may be easily distinguished from patient 30. If assembly 24 comprises sensor 72 with an infra-red projector, marker elements 36 may be configured as retro-reflectors which selectively reflect only infra-red radiation.

In an imaging step 304, image capturing devices 68 acquire images of the scene in front of assembly 24. Sensor 72, if present, also captures a corresponding image of the scene. Processor 26 analyzes the images to identify marker elements 36, and from the identified elements determines the orientation of ROI 34 with respect to assembly 24, and also the distance of the ROI from the assembly. Even if sensor 72 is not present, it will be understood that having two devices 68 acquiring respective images of the scene simplifies the analysis needed to be performed by the processor to identify elements 36. In addition, having two capturing devices 68 reduces the number of elements 36 required to accurately determine the orientation and distance of the ROI with respect to assembly 24, compared to the number required if only one capturing device 68 is used. With two capturing devices 68 the inventors have found it is sufficient to have one marker with three marker elements to accurately locate the ROI with respect to assembly 24. If sensor 72 is present, its image alone may be sufficient to identify elements 36, although typically processor 26 uses the images from devices 68 to improve the accuracy of the orientation and distance measures of the ROI determined by the sensor.

Processor 26 also analyzes the images acquired by devices 68 in order to determine a measure of the brightness of the scene in front of assembly 24.

In a frame orientation step 305, the processor rotates combiners 52A and 52B with respect to their respective frames so that the combiners are orthogonal to the gaze directions of the professional towards the ROI. The processor uses equations (A), (B) and/or (C) to determine the angles of rotation of the combiners.

In a masking step 306, the processor generates circular occlusion masks 80 in screens 60. The processor, using the orientation of the ROI measured in step 304 and the central adjustment of combiners 52 in step 300, determines positions for the masks that will occlude ROI 34. From the brightness measured in step 304, and from the correspondence between pupil size and brightness stored in initial step 300, the processor estimates a value of the pupil diameter of the professional.

In one embodiment the processor sets the diameter of masks 80 according to equation (7), i.e., inter alia, according to the professional's pupil size, so that the masks fully occlude ROI 34. In this case partially occluded ring 130 surrounds ROI 34, the fraction of partial occlusion within the ring being given by equations (12) and (18).

In some embodiments the processor determines sections of the scene corresponding to partially occluded ring 130, and as acquired by devices 68. The processor then configures micro-projectors 64 to overlay video of the acquired sections onto the partially occluded ring, so as to compensate for the partial occlusion. Typically, processor configures the intensity of the projected video to be the inverse of the fraction of the occlusion.

In an alternative embodiment, rather than setting the diameter of the masks to be according to equation (7), the processor sets the diameter to be reduced from the value determined by the equation. The reduction is typically determined by professional 22. In one embodiment the diameter is set to be 90% of the value determined by equation (7).

In a further alternative embodiment, the processor, using instructions from professional 22, sets the diameter of the masks to be larger than the diameter of equation (7). In one embodiment the diameter is set to be 110% of the value determined by equation (7).

In a mask projection step 308 processor 26 uses micro-projectors 64 to project augmented video onto occlusion masks 80. In the case of the augmented video including two or more types of images being projected onto the masks, processor 26 registers the images with each other. However, the images are not necessarily registered, and are typically misaligned, with the scene surrounding and outside the masks. Thus, as exemplified by FIG. 2E and the description of the figure, a video image 114 of the upper portion of the distal end of device 38, together with a stored image 112 corresponding to the lower portion of the distal end, are registered together and are projected onto masks 80. As is also illustrated in FIG. 2E, the images on masks 80 are typically misaligned with the visible scene outside the masks.

In a further projection step 310, processor 26 uses micro-projectors 64 to project augmented video onto the partially occluded ring surrounding the masks, and/or the non-occluded section of combiners 52. As in step 308, multiple image types are registered together, but are typically misaligned with the visible scene of the non-occluded section.

Typical images that are projected in steps 308 and 310 include, but are not limited to, those described above with respect to FIGS. 2C, 2D, and 2E, and the choice and positioning of the images is typically under the overall control of professional 22. In a mentoring situation, at least some of the images are typically under control of a mentor of professional 22.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:
1. A method, comprising:
positioning a retaining structure in proximity to a left eye and a right eye of a subject;
mounting a first optical waveguide on the structure in front of the left eye and a second optical waveguide on the structure in front of the right eye;
connecting a first rotator to the first optical waveguide, the first rotator being configured to rotate the first optical waveguide about a first axis;
connecting a second rotator to the second optical waveguide, the second rotator being configured to rotate the second optical waveguide about a second axis;
coating the first optical waveguide with a first pixelated screen comprising a first array of variably transparent pixels;
coating the second optical waveguide with a second pixelated screen comprising a second array of variably transparent pixels;
mounting at least one image capturing device on the structure, the device being configured to capture an image of a scene viewed by the left and right eyes;
rendering a first section of the first screen at least partially opaque and a second section of the second screen at least partially opaque;

rotating the first rotator so that the first optical waveguide is oriented to be orthogonal to a first gaze direction from the left eye to a region of interest in the scene; and rotating the second rotator so that the second optical waveguide is oriented to be orthogonal to a second gaze direction from the right eye to the region of interest in the scene.

2. The method according to claim 1, wherein the first section of the first screen and the second section of the second screen occlude the region of interest.

3. The method according to claim 1, wherein the first and second axes are vertical axes.

4. The method according to claim 1, wherein the first waveguide transmits to the left eye first rays of an image that are orthogonal to the first waveguide, and wherein the second waveguide transmits to the right eye second rays of the image that are orthogonal to the second waveguide.

5. The method according to claim 1, wherein the region of interest is not at infinity from the left and right eyes.

6. The method according to claim 1, and comprising positioning a marker in proximity to the region of interest, and using the marker to estimate a distance from region of interest to the left and right eyes.

7. An augmented reality assembly, comprising:

a retaining structure, configured to be positioned in proximity to a left eye and a right eye of a subject;

a first optical waveguide mounted on the structure in front of the left eye;

a first correcting lens mounted on the structure between the first optical waveguide and the left eye and configured to redirect light from the first optical waveguide so that a first image seen by the left eye appears closer than infinity;

a first rotator connected to the first optical waveguide and configured to rotate the first optical waveguide about a first axis;

a second optical waveguide mounted on the structure in front of the right eye;

a second correcting lens mounted on the structure between the second optical waveguide and the right eye and configured to redirect light from the second optical waveguide so that a second image seen by the right eye appears closer than infinity;

a second rotator connected to the second optical waveguide and configured to rotate the second optical waveguide about a second axis;

a first pixelated screen, comprising a first array of variably transparent pixels, coating the first optical waveguide;

a second pixelated screen, comprising a second array of variably transparent pixels, coating the second optical waveguide;

at least one image capturing device mounted on the structure configured to capture a third image of a scene viewed by the left and right eyes; and a processor, configured to render a first section of the first screen at least partially opaque and a second section of the second screen at least partially opaque, to rotate the first rotator so that the first optical waveguide is oriented to be orthogonal to a first gaze direction from the left eye to a region of interest in the scene, and to rotate the second rotator so that the second optical waveguide is oriented to be orthogonal to a second gaze direction from the right eye to the region of interest.

8. The assembly according to claim 7, wherein the first waveguide transmits towards the left eye first rays of the first image that are orthogonal to the first waveguide, and wherein the second waveguide transmits towards the right eye second rays of the second image that are orthogonal to the second waveguide.

* * * * *